US012191070B2

(12) United States Patent
Bhutani et al.

(10) Patent No.: US 12,191,070 B2
(45) Date of Patent: Jan. 7, 2025

(54) WIRELESS LOAD CONTROL DEVICE

(71) Applicant: Lutron Technology Company LLC, Coopersburg, PA (US)

(72) Inventors: Ankit Bhutani, Bethlehem, PA (US); Nikhil Vithal Bhate, Zionsville, PA (US); William Taylor Shivell, Breinigsville, PA (US); Sean R. Pearson, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/508,815

(22) Filed: Nov. 14, 2023

(65) Prior Publication Data

US 2024/0153699 A1 May 9, 2024

Related U.S. Application Data

(63) Continuation of application No. 18/164,993, filed on Feb. 6, 2023, now Pat. No. 11,817,257, which is a continuation of application No. 17/518,655, filed on Nov. 4, 2021, now Pat. No. 11,574,771, which is a continuation of application No. 16/921,476, filed on Jul. 6, 2020, now Pat. No. 11,170,932, which is a continuation of application No. 15/583,917, filed on May 1, 2017, now Pat. No. 10,707,014, which is a continuation of application No. 13/780,514, filed on Feb. 28, 2013, now Pat. No. 9,679,696.

(60) Provisional application No. 61/726,465, filed on Nov. 14, 2012.

(51) Int. Cl.

| | |
|---|---|
| ***H01Q 1/22*** | (2006.01) |
| ***H01F 38/14*** | (2006.01) |
| ***H01Q 9/42*** | (2006.01) |

(52) U.S. Cl.
CPC .............. *H01F 38/14* (2013.01); *H01Q 1/22* (2013.01); *H01Q 9/42* (2013.01)

(58) Field of Classification Search
CPC .................................. H01Q 1/22; H01Q 9/42
See application file for complete search history.

(56) References Cited

U.S. PATENT DOCUMENTS

| | | |
|---|---|---|
| 4,864,588 A | 9/1989 | Simpson et al. |
| 4,932,037 A | 6/1990 | Simpson et al. |
| 4,995,053 A | 2/1991 | Simpson et al. |
| 5,239,205 A | 8/1993 | Hoffman et al. |
| 5,340,954 A | 8/1994 | Hoffman et al. |

(Continued)

*Primary Examiner* — Graham P Smith
(74) *Attorney, Agent, or Firm* — Michael S. Czarnecki; Glen R. Farbanish; Philip N. Smith

(57) ABSTRACT

A provided wireless wallbox dimmer may accommodate a plurality of button configurations. The dimmer may be configured to contain a variable number of controllably conductive devices. The dimmer may include a yoke that defines a first plane and an antenna that defines a second plane that is substantially parallel to and spaced apart from the first plane. The yoke may have a flange that is oriented angularly offset relative to the first plane and provides a plurality of mounting locations for controllably conductive devices. The antenna may provide the dimmer with a first wireless transmission range. The dimmer may include a faceplate that cooperates with the antenna to provide the dimmer with a second wireless transmission range that is broader than the first wireless transmission range. The dimmer may include a button assembly that is supported independently of the yoke.

13 Claims, 14 Drawing Sheets

(56) References Cited

U.S. PATENT DOCUMENTS

| | | | |
|---|---|---|---|
| 5,736,965 | A | 4/1998 | Mosebrook et al. |
| 5,818,128 | A | 10/1998 | Hoffman et al. |
| 5,982,103 | A | 11/1999 | Mosebrook et al. |
| 6,310,439 | B1 | 10/2001 | Jacoby, Jr. et al. |
| 6,353,443 | B1 | 3/2002 | Ying |
| 7,106,261 | B2 | 9/2006 | Nagel et al. |
| 7,358,927 | B2 | 4/2008 | Leubke et al. |
| 7,362,285 | B2 | 4/2008 | Webb et al. |
| 7,408,525 | B2 | 8/2008 | Webb et al. |
| 7,548,216 | B2 | 6/2009 | Webb et al. |
| 7,573,436 | B2 | 8/2009 | Webb et al. |
| 7,592,967 | B2 | 9/2009 | Mosebrook et al. |
| 7,714,790 | B1 | 5/2010 | Feldstein et al. |
| 7,756,556 | B2 | 7/2010 | Patel et al. |
| 7,834,817 | B2 | 11/2010 | Mosebrook et al. |
| 7,928,917 | B1 | 4/2011 | Feldstein et al. |
| 8,173,920 | B2 | 5/2012 | Altonen et al. |
| 9,679,696 | B2 | 6/2017 | Bhutani et al. |
| 2009/0184652 | A1 | 7/2009 | Bollinger, Jr. et al. |
| 2017/0237173 | A1 | 8/2017 | Bhutani et al. |

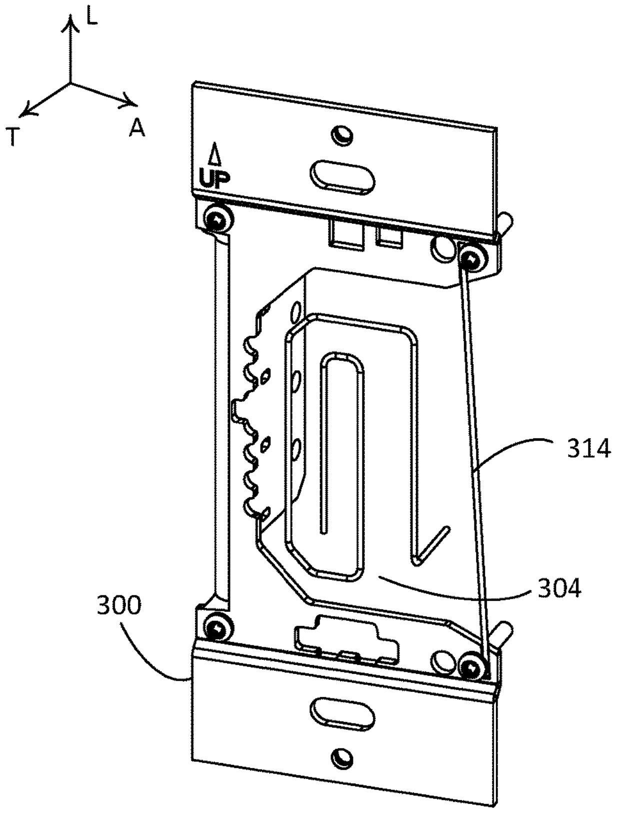
FIG. 6A
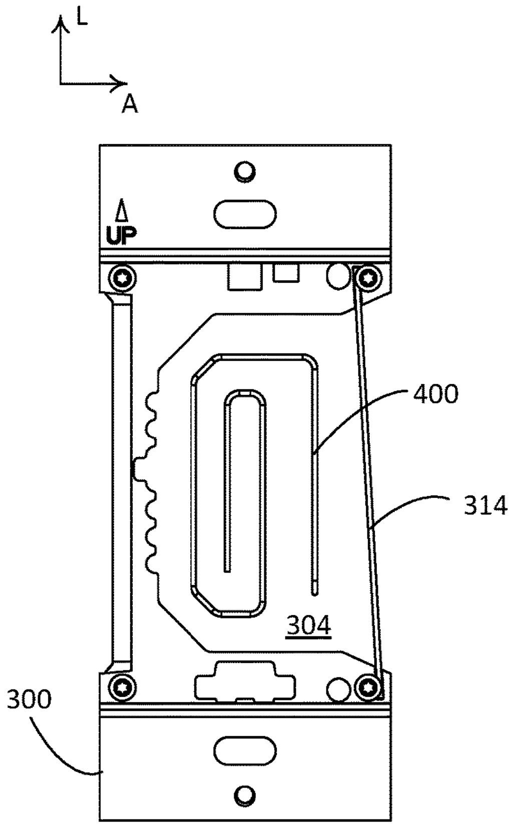
FIG. 6B
FIG. 6C
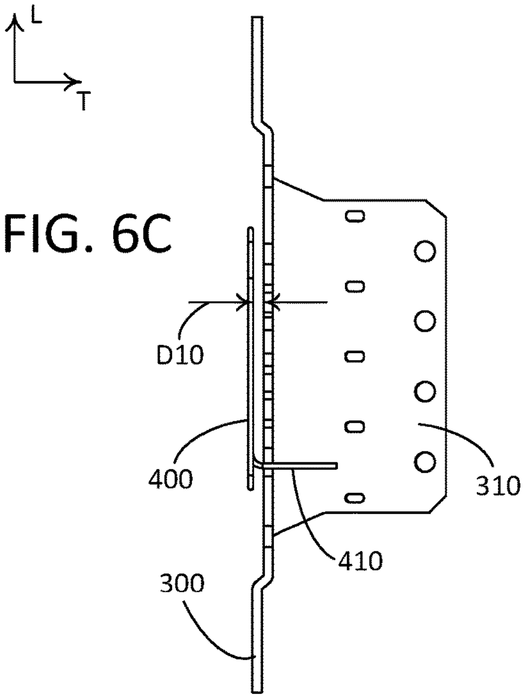
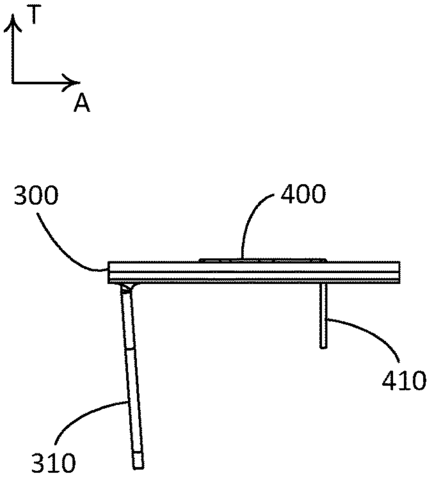
FIG. 6D

WIRELESS LOAD CONTROL DEVICE

CROSS-REFERENCE TO RELATED APPLICATIONS

This application is a continuation of U.S. patent application Ser. No. 18/164,993, filed Feb. 6, 2023, now U.S. Pat. No. 11,817,257, issued Nov. 14, 2023; which is a continuation of U.S. patent Ser. No. 17/518,655, filed Nov. 4, 2021, now U.S. Pat. No. 11,574,771, issued Feb. 7, 2023; which is a continuation of U.S. patent application Ser. No. 16/921,476, filed Jul. 6, 2020, now U.S. Pat. No. 11,170,932 issued Nov. 9, 2021; which is a continuation of U.S. patent application Ser. No. 15/583,917, filed May 1, 2017, now U.S. Pat. No. 10,707,014 issued Jul. 7, 2020; which is a continuation of U.S. patent application Ser. No. 13/780,514, filed Feb. 28, 2013, now U.S. Pat. No. 9,679,696, issued Jun. 13, 2017; which claims the benefit of U.S. Provisional Application No. 61/726,465, filed Nov. 14, 2012, which is incorporated herein by reference in its entirety.

BACKGROUND

Wireless wallbox dimmers are typically constructed using non-interchangeable components. For example, a first wallbox dimmer may include a first button assembly having a first button configuration, while a second wallbox dimmer may include a second button assembly having a second button configuration that is different from the first button configuration. Typically, the button assemblies are not interchangeable between the two dimmers because different dimmers with different button configurations typically require different internal components that are specifically designed to cooperate with the specific button assemblies. Examples of such internal components may include wireless antennas, yokes, cradles, printed circuit board (PCB), and the like. Thus, to provide a variety of dimmers having different button configurations, a manufacturer must manufacture not only various button assemblies, but also various internal components designed specifically for use with each button assembly.

In a typical wallbox dimmer, the button assembly is configured to be attached to, and supported directly by, the yoke. It is well known that the yoke may be warped during installation of the dimmer, e.g., due to over tightening of one or more screws used to the secure the dimmer to the wallbox. Distortion of the yoke may cause one or more of the buttons to become nonfunctional.

Further, known wallbox dimmers are typically capable of housing only one or two semiconductor power devices, such as triacs or field-effect transistors (FETs). Additionally, the one or more controllably conductive devices typically must be attached to predetermined locations on the yoke.

It may be desirable, therefore, to provide a wireless wallbox dimmer having a universal structure that may accommodate a plurality of button configurations and an antenna that works with the plurality of button configurations as well as in a variatey of installation environments. A wireless wallbox dimmer having a yoke, with a button assembly that is supported independently of the yoke, may also be desirable. It may be further desirable to provide a wireless wallbox dimmer that may be configured to contain a variable number of semiconductor power devices.

SUMMARY

A load control device for controlling an amount of power delivered from an alternating current (AC) power source to an electrical load may include a yoke, which may be a metal yoke, that defines a first plane. The load control device may include a two loop antenna that defines a second plane. The second plane may be substantially parallel to and spaced apart from the first plane.

The load control device may include a cradle configured to be at least partially received in the yoke. The yoke may be configured to be received in the cradle along a direction that is substantially parallel to the first plane.

The yoke may include a plate member that defines the first plane. The yoke may include a flange supported by the plate member. The flange may be oriented along a second plane that is angularly offset relative to the first plane. The flange may be configured to support a plurality of controllably conductive devices. Thus, the load control device may be configured to contain a variable number of controllably conductive devices.

The antenna may define an inner loop and an outer loop that at least partially encloses the inner loop. The antenna may provide the load control device with a first wireless transmission range. The load control device may include a faceplate that is in electrical communication with the antenna. The antenna and the faceplate may cooperate to provide the load control device with a second wireless transmission range that is broader than the first wireless transmission range.

The cradle may define a plurality of activation members. The cradle may be configured to receive at least a portion of the antenna such that the antenna does not interfere with operation of any of the plurality of activation members. The cradle may be configured to accommodate a plurality of button configurations. For example, the activation members may be arranged to accommodate any of a plurality of button configurations. Thus, the load control device may include a button assembly that is supported independently of the yoke.

BRIEF DESCRIPTION OF THE DRAWINGS

FIG. 6A is a perspective view of a partial assembly of the components of the load control device illustrated in FIG. 2, including the yoke illustrated in FIGS. 3A-3C, the antenna illustrated in FIGS. 5A-5C, and an electrically conductive strap attached to the yoke illustrated in FIGS. 3A-3C.

FIG. 6B is a front elevation view of the partial assembly illustrated in FIG. 6A.

FIG. 6C is a right side elevation view of the partial assembly illustrated in FIG. 6A.

FIG. 6D is a bottom elevation view of the partial assembly illustrated in FIG. 6A.

DETAILED DESCRIPTION

Figure 1:
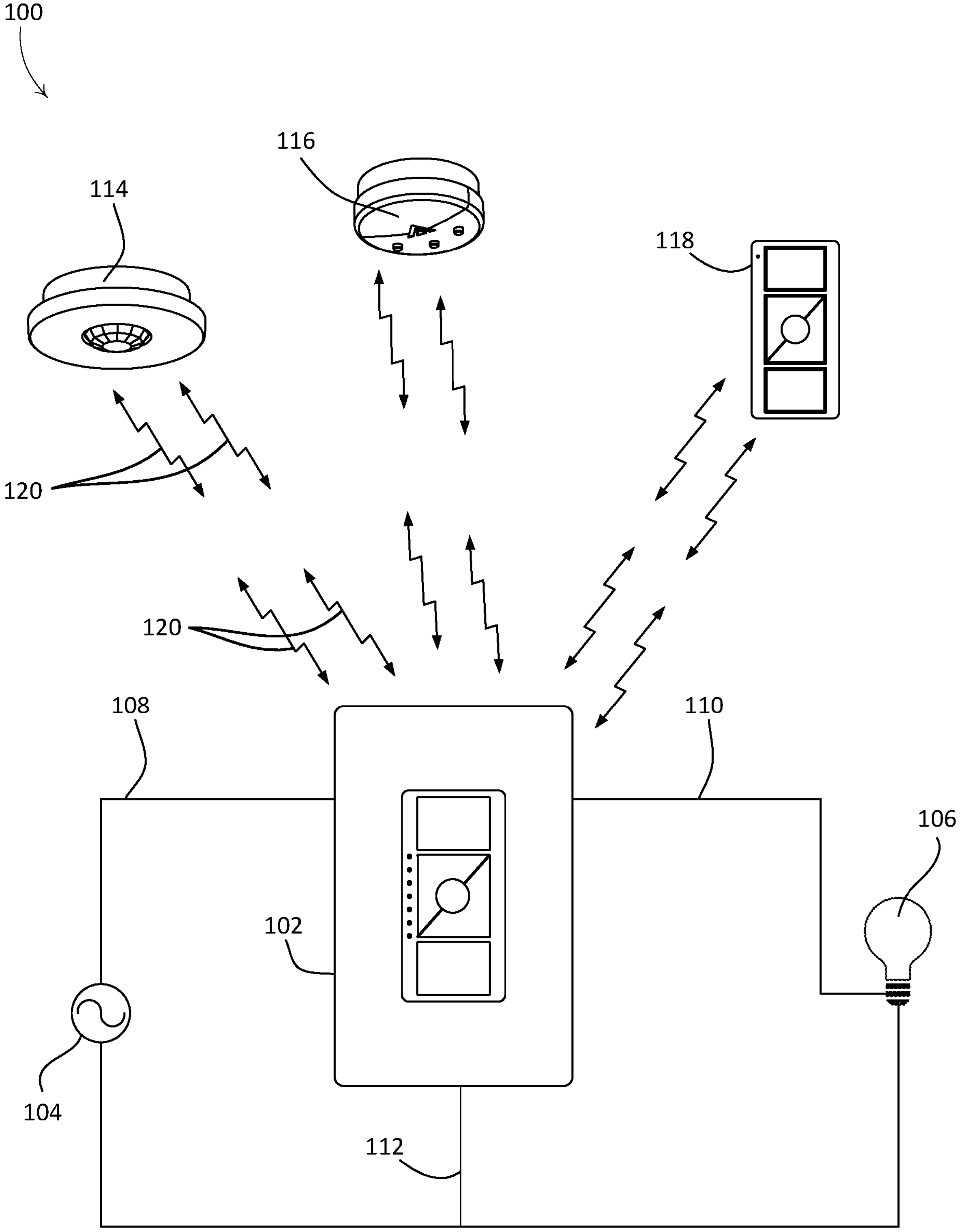
FIG. 1 is a system diagram depicting an example load control device and example remote control devices configured to wirelessly communicate with the load control device.

FIG. 1 depicts an example load control system 100 that may include one or more components capable of wireless communication with each other. For example, the load control system 100 may include a load control device 102 and one or more components (e.g., sensors, remote control units, etc.) configured to wirelessly communicate with the load control device 102, for example to control one or more functions of the load control device 102.

The load control device 102 may be electrically connected between an alternating-current (AC) power source 104 and an electrical load 106. The load control device 102 may be operable to control an amount of power delivered from the AC source 104 to the load 106. The load 106 may be a lighting load, for example, or any other electrical load.

The load control device 102 may be, for example, an electronic switch or a dimmer switch. The load control device 102 may include a controllably conductive device coupled in series electrical connection between the AC source 104 and the load 106 for controlling an amount of power delivered from the AC source 104 to the load 106. For example, the controllably conductive device may include one or more semiconductor power devices, such as, a thyristor (e.g., a triac), a field-effect transistor (FET) in a rectifier bridge, two FETs in anti-series connection, one or more insulated-gate bipolar junction transistors (IGBTs), or any suitable bidirectional semiconductor switch. The load control device 102 may be connected to the AC source 104 by a first wire 108, to the load 106 by a second wire 110, and to an electrical path between the load 106 and a neutral side of the AC source 104 by a third wire 112. The first wire 108 may be referred to as a hot wire, the second wire 110 may be referred to as a switched-hot or dimmed-hot wire, and the third wire 112 may be referred to as a neutral wire. In this regard, the illustrated load control device 102 may be referred to as a three-wire load control device. However it should be appreciated that the load control system 100 is not limited to a three-wire load control device, and that the load control system 100 can alternatively employ a two-wire load control device that does not require a connection to the neutral side of the AC source 104.

The controllably conductive device (not shown) may operate in respective non-conductive and conductive states within respective portions of each half cycle of an AC waveform provided by the AC source 104. The controllably conductive device may be switched between the non-conductive and conductive states, respectively, in response to a triggering signal. In a forward phase-control system, generation of a triggering signal may be synchronized with an AC line voltage supplied by the AC source 104 such that the triggering signal is generated at a certain time after a zero-crossing is detected. A zero-crossing may be the time at which an AC supply voltage of the AC source 104 transitions from positive to negative polarity, or from negative to positive polarity, at the beginning of each half-cycle. Responsive to the triggering signal, a gate of the controllably conductive device may be energized, causing the controllably conductive device to operate in the conductive state for the remainder of the AC half cycle.

During the time interval between the zero-crossing and the gate triggering, the controllably conductive device may operate in the non-conductive state. When the controllably conductive device is operating in the non-conductive state, effectively no power is supplied to the load 106. The load control device 102 may be configured to allow for alteration of the time interval, such as in response to adjustment of a user-operable control (e.g., a dimming knob or a slider) or in response to changes in a dimming level signal. Altering the time interval between the zero crossing and the gate triggering (and, thereby affecting the conduction angle of the controllably conductive device) affects the amount of power delivered to the load 106. See, for example, commonly-assigned U.S. Pat. No. 5,430,356, entitled "Programmable Lighting Control System With Normalized Dimming For Different Light Sources," which is incorporated herein by reference in its entirety. Thus, the controllably conductive device may be switched to affect the AC voltage waveform provided to the load 106, thereby controlling the power delivered to the load 106.

The load control device 102 may be configured for wireless communication and the load control system 100 may include one or more remote control devices configured to wirelessly communicate with and remotely control the load control device 102. In this regard, the load control device 102 may be referred to as a wireless load control device. For example, the load control system 100 may include an occupancy sensor 114, a daylight sensor 116, or a remote control 118, such as a remote keypad, for example. Each of the occupancy sensor 114, the daylight sensor 116, and the remote control unit 118 may be configured to wirelessly communicate with the load control device 102 over respective wireless communication links to control one or more functions of the load control device 102. For example, the occupancy sensor 114, the daylight sensor 116, and the remote control 118 may each transmit radio-frequency (RF) signals 120 to the load control device 102. The wireless communication links may be the same or different, and may include one or more of a Clear Connect RF link, a WiFi link, a cellular wireless link, a Bluetooth link, a ZigBee® link, for example.

Figure 2:
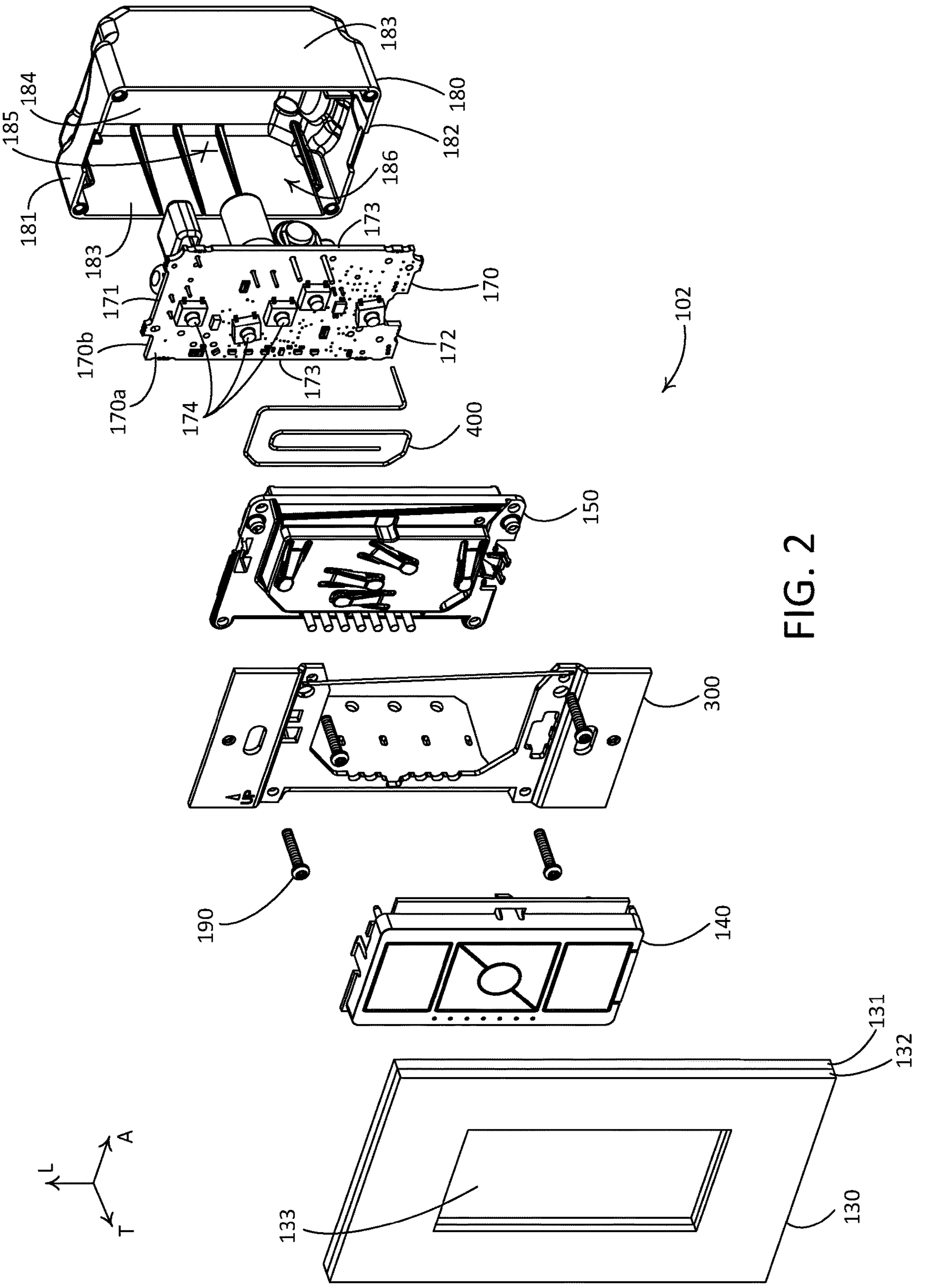
FIG. 2 is a perspective exploded view of example components of the load control device illustrated in FIG. 1.

FIG. 2 is an exploded view of the load control device 102. The load control device 102 may include a number of components, including a faceplate assembly 130, a button assembly 140, a yoke 300, a cradle 150, an antenna 400, a printed circuit board (PCB) 170, a rear cover 180, and one or more fasteners for securing one or more of the components of the load control device 102 in an assembled configuration, for example screws 190 for securing the yoke 300 to the rear cover 180.

The illustrated rear cover 180 has a substantially rectangular shape defined by an upper wall 181, a lower wall 182 that is spaced from the upper wall 181 along a longitudinal direction L, opposed side walls 183 that are spaced apart from each other along a lateral direction A that extends substantially perpendicular with respect to the longitudinal direction L, and a rear wall 184. The rear cover 180 may define an open front end 185 that is spaced from the rear wall along a transverse direction T that extends substantially perpendicular to both the longitudinal direction L and the lateral direction A. It should be appreciated that the while the lateral and transverse directions L, T are oriented substantially toward the right or left and the longitudinal direction L is oriented substantially up or down, that the orientation of the load control device 102 may vary during use.

The upper wall 181, lower wall 182, side walls 183, and rear wall 184 of the rear cover 180 may define a cavity 186 that extends into the front end 185 of the rear cover 180 along the transverse direction T. The cavity 186 may be sized to at least partially enclose one or more components of the load control device 102 when the load control device 102 is assembled, and may operate to protect one or more components of the load control device 102. The illustrated rear cover 180 includes four receptacles 187 located proximate to respective intersections of the upper and lower walls 181, 182 with the side walls 183. The receptacles 187 may be configured to receive fasteners used to secure one or more components of the load control device 102 in an assembled configuration. For example, inner surfaces of the receptacles 187 may be threaded so as to engage with corresponding threads of the screws 190.

The illustrated PCB 170 includes a substrate body that defines a first surface **170*a* of the PCB 170 and an opposed second surface 170*b* of the PCB 170 that is spaced from the first surface 170*a* along the transverse direction T. The substrate body may be sized such that the PCB 170 may be received in the cavity 186 of the rear cover 180. For example, the PCB may have an upper end 171, an opposed lower end 172 that is spaced from the upper end 171 along the longitudinal direction L and first and second opposed sides 173 spaced apart from each other along the lateral direction A. A spacing of the upper end 171 from the lower end 172 along the longitudinal direction L may be shorter than a spacing between respective inner surfaces of the upper and lower walls 181, 182 of the rear cover 180 along the longitudinal direction L, and a spacing from one side 173 to the other along the lateral direction A may be shorter than a spacing between respective inner surfaces of the side walls 183 of the rear cover 180** along the lateral direction A.

Electrical components may be attached (e.g., mounted) to one or both of the first and second surfaces **170*a*, 170*b* and placed in electrical communication with electrical circuits defined on the first and second surfaces 170*a*, 170*b* of the PCB 170 and/or in a body of the PCB. For example, a plurality of switches 174 that may be operated to control one or more functions of the load control device 102 may be mounted on the first surface 170*a* of the PCB 170. An RF communication circuit (not shown) may be mounted to the PCB 170. The RF communication circuit may include an RF transmitter, an RF receiver, and/or an RF transceiver. The RF communication circuit may be operable to transmit and receive RF signals at a communication frequency (e.g., communication frequency f RF) for controlling one or more functions of the load control device 102**.

The faceplate assembly 130 may have any suitable shape, such as the illustrated substantially flat, rectangular shape. The faceplate assembly 130 may include an adapter 131 and a faceplate 132. The adapter 131 may be configured to be attached to the yoke 300 and the faceplate 132 may be configured to be releasably attached to the adapter 131, for example as described in commonly-assigned U.S. Pat. No. 4,835,343, entitled "Two Piece Face Plate For Wall Box Mounted Device," which is incorporated herein by reference in its entirety. The components of the faceplate assembly 130, for example the adapter 131 and the faceplate 132, may be made of any suitable material, for example metal or plastic. The faceplate assembly 130 (e.g., the adapter 131 and the faceplate 132) may define an opening 133 that extends through the faceplate assembly 130 along a direction that is substantially parallel to the transverse direction T. The opening 133 may be sized to receive at least a portion of the button assembly 140 when the faceplate assembly 130 is attached to the yoke 300. It should be appreciated that the load control device 102 is not limited to the illustrated faceplate assembly 130, and that the load control device 102 may employ any suitable faceplate, or no faceplate, as desired.

Figure 3A:
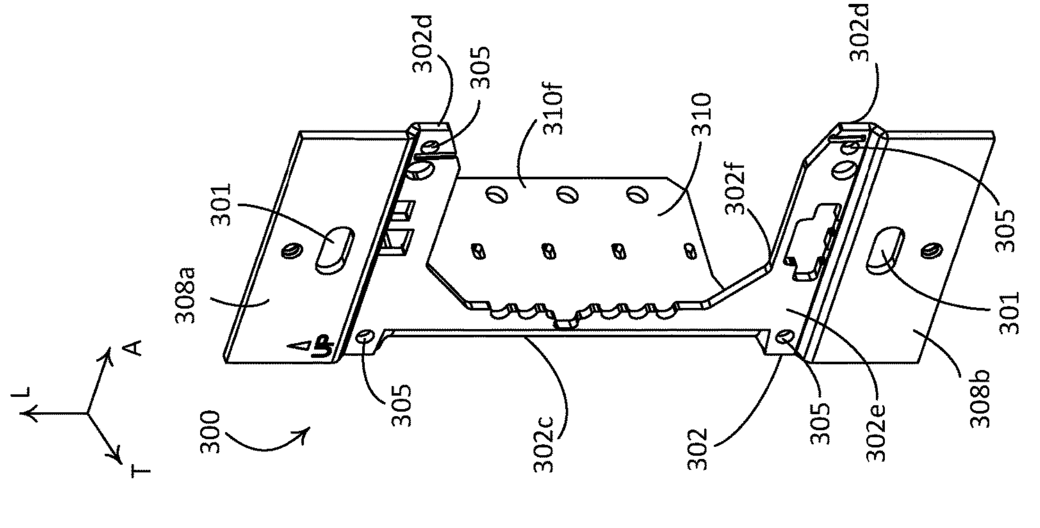
FIG. 3A is a perspective view of an example yoke that may be used with the load control device illustrated in FIG. 2.
Figure 3B:
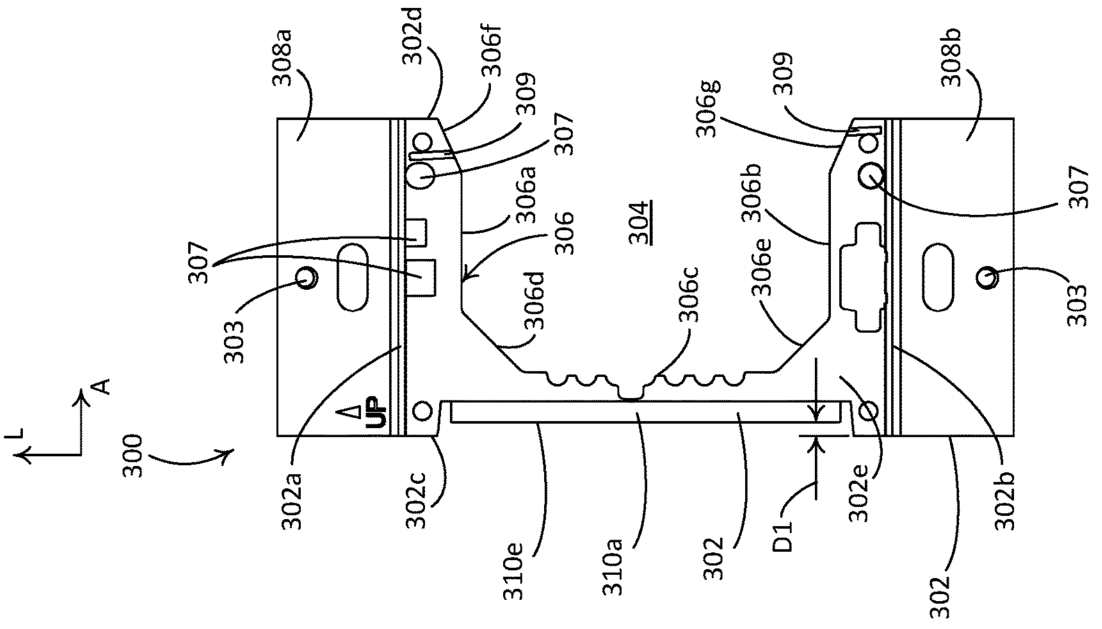
FIG. 3B is a front elevation view of the yoke illustrated in FIG. 3A.
Figure 3C:
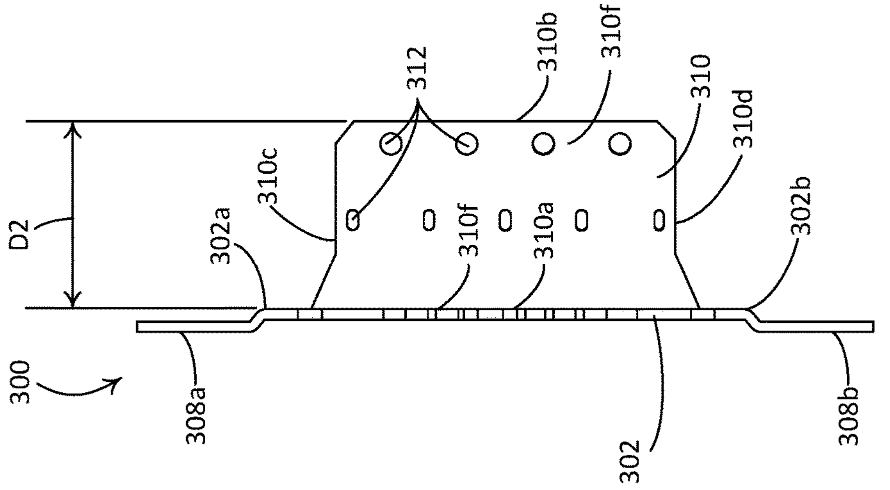
FIG. 3C is side elevation view of the yoke illustrated in FIG. 3A.

FIGS. 3A-3C depict an example yoke 300 that may be used, for example, with the load control device 102. The yoke 300 may be made of any suitable material, such as metal. The yoke 300 may include a plate member 302 that defines an upper end **302*a*, an opposed lower end 302*b* that is spaced from the upper end 302*a* along the longitudinal direction L, opposed first and second sides 302*c*, 302*d* that are spaced from each other along the lateral direction A, an outer surface 302*e*, and an inner surface 302*f* that is spaced from the outer surface 302*e* along the transverse direction T. The outer and inner surfaces 302*e*, 302*f*** of the plate member 302 may be planar surfaces that are substantially coplanar with a plane defined by the longitudinal direction L and the lateral directions A.

The plate member 302 may have a section of material removed therefrom so as to define an opening 304 sized to receive one or more components of the load control device 102, for example the opening 304 may be sized to receive at least a portion of the cradle 150 therein. The opening 304 extends into the second side 302*d* of the plate member 302. The plate member 302 may at least partially define a perimeter 306 of the opening 304.

The perimeter 306 of the illustrated opening 304 includes an upper portion 306*a*, a lower portion 306*b*, a side portion 306*c*, first and second offset portions 306*d*, 306*e*, and third and fourth offset portions 306*f*, 306*g*. The upper portion 306*a* extends substantially parallel to the lateral direction A, is spaced from the upper end 302*a* along the longitudinal direction L, and is located nearer the upper end 302*a* than the lower end 302*b*. The lower portion 306*b* extends substantially parallel to the lateral direction A, is spaced from the lower end 302*b* along the longitudinal direction L, and is located nearer the lower end 302*b* than the upper end 302*a*. The side portion 306*c* extends substantially parallel to the longitudinal direction L, is spaced from the first side 302*c* along the lateral direction A, and is located nearer the first side 302*c* than the second side 302*d*.

The first and second offset portions 306*d*, 306*e* are angularly offset relative to both the longitudinal and lateral directions L, A, and extend between the upper and side portions 306*a*, 306*c* and the lower and side portions 306*b*, 306*c*, respectively. The third and fourth offset portions 306*f*, 306*g* are angularly offset relative to both the longitudinal and lateral directions L, A, and extend from the second side 302*d* to respective ends of the upper and lower portions 306*a*, 306*b* that are nearest the second side 302*d*, such that the opening 304 is narrowed along the longitudinal direction L between the second side 302*d* and the upper and lower portions 306*a*, 306*b* of the perimeter 306. The plate member 302 is closed at the first side 302*c* and is at least partially open at the second side 302*d*, such that the plate member 302, and more generally the yoke 300, is substantially "C" shaped. It should be appreciated that the opening 304 of the plate member 302 is not limited to the illustrated geometry, and that the plate member 302 may alternatively define any other suitable opening geometry, for instance an opening having a perimeter with closed sides spaced from one another along the lateral direction A.

The third and fourth offset portions 306*f*, 306*g* may operate to guide one or more components into a received position within the opening 304. As shown, the third and fourth offset portions 306*f*, 306*g* may operate to guide at least a portion of the cradle 150 into an inserted position in the opening 304 if the cradle 150 is disposed into an inserted position within the opening 304 along a direction from that is substantially parallel to the lateral direction A (e.g., right to left in FIG. 3B).

The plate member 302 may define one or more attachment members configured to allow a shorting member to be attached to the yoke 300, as described elsewhere herein. The illustrated plate member 302 defines a pair of opposed channels 309 that are recessed in the outer surface 302*e* of the plate member 302, proximate the upper and lower ends 302*a*, 302*b*, respectively. The illustrated channels 309 are sized to at least partially receive respective ends of a shorting wire 314, for example as depicted in FIGS. 6A-6B.

The yoke 300 may include one or more tab members that may be configured to facilitate attachment of the load control device 102 to a suitable receptacle, for example a single gang electrical wallbox. The yoke 300 may include an upper tab member 308*a* that extends upward from the upper end 302*a* of the plate member 302 along the longitudinal direction L and an opposed lower tab member 308*b* that extends downward from the lower end 302*b* of the plate member 302 along the longitudinal direction L. One or both of the upper and lower tab members 308*a*, 308*b* may be substantially coplanar relative to the plate member 302 and may be offset from the plate member 302 along the transverse direction T, for example offset forward from the outer surface 302*e*, such that the plate member 302 is recessed along the transverse direction T relative to the upper and lower tab members 308*a*, 308*b*. The upper and lower tab members 308*a*, 308*b* may be integral, for example monolithic, with the plate member 302 or may be separate from the plate member 302 and attached thereto.

One or more of the plate member 302, the upper tab member 308*a*, and the lower tab member 308*b* may define respective apertures (e.g., apertures 301, 303, 305, 307) that extend there through, for example along a direction that extends substantially parallel to the transverse direction T. The apertures 301 in the upper tab member 308*a* and the lower tab member 308*b* may be sized to receive screws to attach the yoke 300 to an electrical wallbox, which may be made of, for example, metal or plastic. The apertures 303 in the upper tab member 308*a* and the lower tab member 308*b* may be sized to receive screws that may also be received in complementary apertures of one or more components of the faceplate assembly 130 to attach the faceplate to the yoke 300. One or more of the apertures 305, 307 may be sized to at least partially receive one or more components of the load control device 102 or respective attachment members supported by the one or more components, for example the screws 190, one or more attachment members of the button assembly 140, or one or more attachment members of the cradle 150, as described elsewhere herein.

The yoke 300 may include one or more flange members that may be oriented so as to be angularly offset relative to the plate member 302. For example, the illustrated yoke 300 includes a flange member 310 located along the first side 302*c* of the plate member 302 that extends inwardly relative to inner surface 302*f*. The illustrated flange member 310 may be defined in a plane that is angularly offset with respect to the plane of the plate member 302, for example substantially normal with respect to the plate member 302.

The flange member 310 may define a base 310*a* that extends along at least a portion of the plate member 302, an inner edge 310*b* that is spaced from the base 310*a*, and opposed upper and lower edges 310*c*, 310*d* that extend from the base 310*a* to the inner edge 310*b* and may be spaced from one another, for example along the longitudinal direction L. The flange member 310 may further define a first, outer surface 310*e* and an opposed second, inner surface 310*f* that is spaced from the outer surface 310*e*, for example along the lateral direction A.

The outer surface 310*e* may be spaced from the first side 302*c* of the plate member 302 by a distance D1 along the lateral direction A such that the flange member 310 is received in the rear cover 180 when the yoke 300 is in an assembled position relative to the rear cover 180. For example, the outer surface 310*e* may be spaced from the first side 302*c* of the plate member 302 such that the distance D1 is approximately equal to (e.g., slightly shorter than) a thickness of a corresponding side wall 183 of the rear cover 180. The inner edge 310*b* of the flange member 310 may be spaced from the base 310*a* by a distance D2 along the transverse direction T such that the inner edge 310*b* extends substantially to the rear wall 184 of the rear cover 180 when the yoke 300 is attached to the rear cover 180. The base 310*a*, inner edge 310*b*, and the upper and lower edges 310*c*, 310*d* may define a perimeter of the flange member 310.

The base 310*a* of the illustrated flange member 310 extends along a portion of the first side 302*c* of the plate member 302 between the upper and lower ends 302*a*, 302*b* and the inner edge 310*b* extends substantially parallel to the longitudinal direction L. The upper and lower edges 310*c*, 310*d* have respective first portions and second portions. The first portions extend between the base 310*a* and the second portions, and are angularly offset with respect to each other and with respect to the transverse direction T, such that the flange member 310 is tapered between the base 310*a* and the second portions. The second portions extend substantially parallel to the transverse direction T between the first portions and the inner edge 310*b*.

The flange member 310 may be configured to enable the attachment of one or more electrical components of the load control device 102, for example to enable the attachment of one or more semiconductor power devices (e.g., controllably conductive devices, such as triacs, FETs, or the like) to the flange member 310 rather than to the PCB 170 (e.g., the first or second surfaces 170*a*, 170*b* of the PCB 170). The flange member 310 may define one or more apertures 312 configured to receive respective fasteners of one or more electrical components that are mounted to the flange member 310. The one or more apertures 312 may extend through the flange member 310, for example along a direction that is substantially normal to the outer and inner surfaces 310*e*, 310*f*. For example, the illustrated flange member 310 defines four apertures 312 that are substantially aligned with one another along the longitudinal direction L.

The illustrated apertures 312 allow the mounting of up to four semiconductor power devices (e.g., four triacs) to the flange member 310. A semiconductor power device may be secured to the flange member 310 using a select one of the apertures 312 and may be electrically connected to the PCB 170, for example by soldering the semiconductor power device to one or more electrical circuits defined on the second surface 170*b* of the PCB 170. With the yoke 300 in an assembled position relative to the rear cover 180, one or more semiconductor power devices attached to the flange member 310 may be enclosed by the rear cover 180 and the plate member 302 of the yoke 300, such that the semiconductor power devices are housed within the load control device 102. One or more semiconductor power devices may be attached to the flange member 310 in desired positions, for example using one or more of the apertures 312. In this regard, the load control device 102 may be configured to house a variable number of semiconductor power devices.

Mounting one or more semiconductor power devices to the flange member 310 rather than to the yoke 300, allows for flexibility and modularity in configuring the load control device 102 in accordance with different applications (e.g., configurations). Moreover, if fewer than four semiconductor power devices are specified for a particular configuration of the load control device 102 (e.g., a load control device 102 having one triac), any one of the four apertures 312 may be selected for use in securing the triac.

The flange member 310 may dissipate heat generated by one or more semiconductor power devices secured to the flange member 310. For example, heat generated by a semiconductor power device secured to the flange member 310 may be conducted into the flange member 310 and through the plate member 302 to one or both of the upper and lower tab members 308*a*, 308*b*.

The flange member 310 may be integral, for example monolithic, with the plate member 302 or may be separate from the plate member 302 and attached thereto. For example, the flange member 310, the upper and lower tab members 308*a*, 308*b*, and the plate member 302 may be monolithic, such that the yoke 300 may be made from a single piece of material. The yoke 300 may be stamped from a piece of a substantially flat piece of sheet metal. The upper and lower tab members 308*a*, 308*b* and the flange member 310 may be formed by bending respective portions of the sheet metal. Apertures of the yoke 300, for instance the apertures 312, may be punched, drilled, or otherwise defined in the sheet metal of the yoke 300, for example before the upper and lower tab members 308*a*, 308*b* and the flange member 310 are bent into position.

It should be appreciated that if the flange member 310 is sized to be substantially equal to or smaller in size than the opening 304, that at least a portion of the material removed from a first yoke to define the opening thereof may define the flange member 310 of an adjacent, successive second yoke. In this regard, it can be said that the flange member of the first yoke is nested in the opening of the second yoke with regards to a manufacturing process that produces the first and second yokes (e.g., a stamping process). It should further be appreciated that the flange member 310 is not limited to the illustrated geometry, and that the flange member can be alternatively constructed with any suitable geometry. It should further still be appreciated that the yoke 300 is not limited to a single flange member as illustrated, and that the yoke 300 may include any suitable number of flange members in the same or different locations relative to the plate member 302, as desired.

Figure 4A:
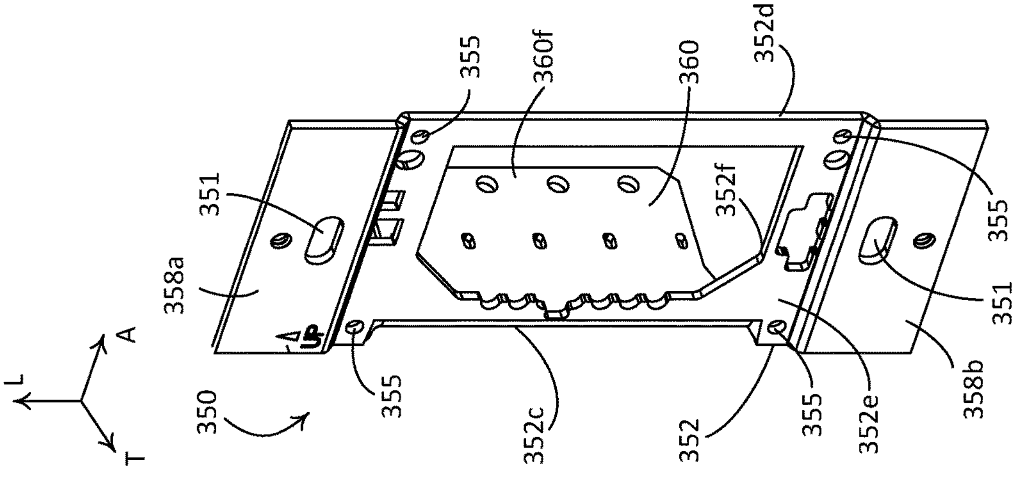
FIG. 4A is a perspective view of another example yoke that may be used with the load control device illustrated in FIG. 2.
Figure 4B:
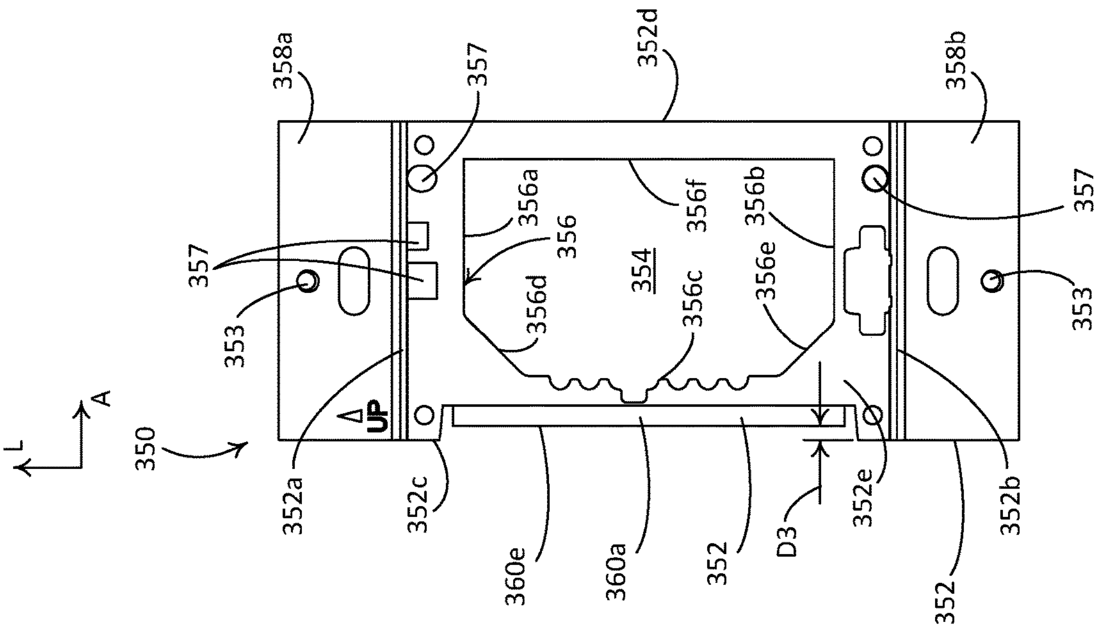
FIG. 4B is a front elevation view of the yoke illustrated in FIG. 4A.
Figure 4C:
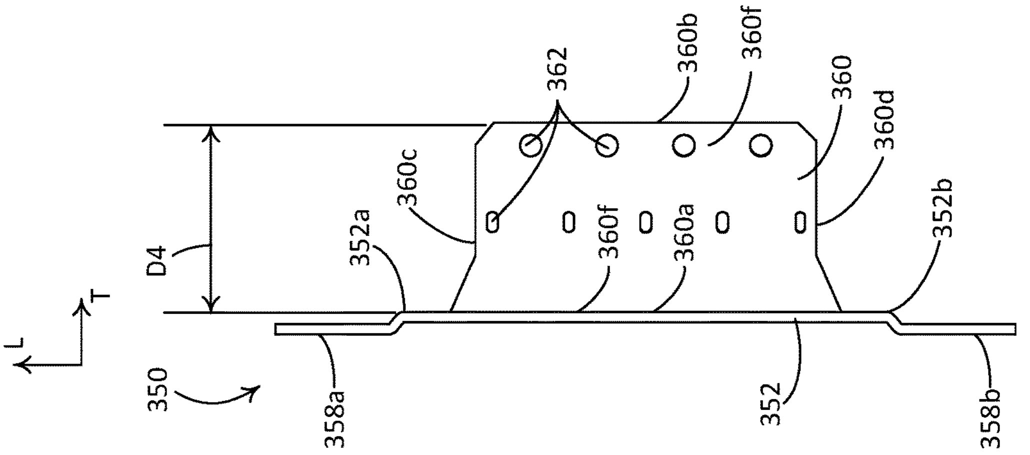
FIG. 4C is side elevation view of the yoke illustrated in FIG. 4A.

FIGS. 4A-4C depict an example yoke 350 that may be used, for example, with the load control device 102, for example in the place of the yoke 300. The yoke 350 may be made of any suitable material, such as metal. The yoke 350 may include a plate member 352 that defines an upper end 352*a*, an opposed lower end 352*b* that is spaced from the upper end 352*a* along the longitudinal direction L, opposed first and second sides 352*c*, 352*d* that are spaced from each other along the lateral direction A, an outer surface 352*e*, and an inner surface 352*f* that is spaced from the outer surface 352*e* along the transverse direction T. The outer and inner surfaces 352*e*, 352*f* of the plate member 352 may be planar surfaces that are substantially coplanar with a plane defined by the longitudinal direction L and the lateral directions A.

The plate member 352 may have a section of material removed therefrom so as to define an opening 354 sized to receive one or more components of the load control device 102, for example the opening 354 may be sized to receive at least a portion of the cradle 150 therein. The opening 354 extends through the plate member 352 along the transverse direction T. The plate member 302 may at least partially define a perimeter 356 of the opening 354. The cradle 150 may be inserted into the opening 354, along a direction substantially parallel to the transverse direction T, for example.

The perimeter 356 of the illustrated opening 354 includes an upper portion 356*a*, a lower portion 356*b*, a first side portion 356*c*, first and second offset portions 356*d*, 356*e*, and a second side portion 356*f*. The upper portion 356*a* extends substantially parallel to the lateral direction A, is spaced from the upper end 352*a* along the longitudinal direction L, and is located nearer the upper end 352*a* than the lower end 352*b*. The lower portion 356*b* extends substantially parallel to the lateral direction A, is spaced from the lower end 352*b* along the longitudinal direction L, and is located nearer the lower end 352*b* than the upper end 352*a*. The first side portion 356*c* extends substantially parallel to the longitudinal direction L, is spaced from the first side 352*c* along the lateral direction A, and is located nearer the first side 352*c* than the second side 352*d*. The second side portion 356*f* extends substantially parallel to the longitudinal direction L, is spaced from the second side 352*d* along the lateral direction A, and is located nearer the second side 352*d* than the first side 352*c*.

The first and second offset portions 356*d*, 356*e* are angularly offset relative to both the longitudinal and lateral directions L, A, and extend between the upper and first side portions 356*a*, 356*c* and the lower and first side portions 356*b*, 356*c*, respectively. It should be appreciated that the opening 354 of the plate member 302 is not limited to the illustrated geometry, and that the plate member 352 may alternatively define any other suitable opening geometry.

The yoke 350 may include one or more tab members that may be configured to facilitate attachment of the load control device 102 to a suitable receptacle, for example a single gang electrical box. The yoke 350 may include an upper tab member 358*a* that extends upward from the upper end 352*a* of the plate member 352 along the longitudinal direction L and an opposed lower tab member 358*b* that extends downward from the lower end 352*b* of the plate member 352 along the longitudinal direction L. One or both of the upper and lower tab members 358*a*, 358*b* may be substantially coplanar relative to the plate member 352 and may be offset from the plate member 352 along the transverse direction T, for example offset forward from the outer surface 352*e*, such that the plate member 352 is recessed along the transverse direction T relative to the upper and lower tab members 358*a*, 358*b*. The upper and lower tab members 358*a*, 358*b* may be integral, for example monolithic, with the plate member 352 or may be separate from the plate member 352 and attached thereto.

One or more of the plate member 352, the upper tab member 358*a*, and the lower tab member 358*b* may define respective apertures (e.g., apertures 351, 353, 355, 357) that extend there through, for example along a direction that extends substantially parallel to the transverse direction T. The apertures 351 in the upper tab member 358*a* and the lower tab member 358*b* may be sized to receive screws to attach the yoke 350 to an electrical wallbox, which may be made of, for example, metal or plastic. The apertures 353 in the upper tab member 358*a* and the lower tab member 358*b* may be sized to receive screws that may also be received in complementary apertures of one or more components of the faceplate assembly 130 to attach the faceplate to the yoke 350. One or more of the apertures 355, 357 may be sized to at least partially receive one or more components of the load control device 102 or respective attachment members supported by the one or more components, for example the screws 190, one or more attachment members of the button assembly 140, or one or more attachment members of the cradle 150.

The yoke 350 may include one or more flange members that may be oriented so as to be angularly offset relative to the plate member 352. For example, the illustrated yoke 350 includes a flange member 360 located along the first side 352*c* of the plate member 352 that extends inwardly relative to inner surface 352*f*. The illustrated flange member 360 may be defined in a plane that is angularly offset with respect to the plane of the plate member 352, for example substantially normal with respect to the plate member 352.

The flange member 360 may define a base 360*a* that extends along at least a portion of the plate member 352, an inner edge 360*b* that is spaced from the base 360*a*, and opposed upper and lower edges 360*c*, 360*d* that extend from the base 360*a* to the inner edge 360*b* and may be spaced from one another, for example along the longitudinal direction L. The flange member 360 may further define a first, outer surface 360*e* and an opposed second, inner surface 360*f* that is spaced from the outer surface 360*e*, for example along the lateral direction A.

The outer surface 360*e* may be spaced from the first side 352*c* of the plate member 352 a distance D3 along the lateral direction A such that the flange member 360 is received in the rear cover 180 when the yoke 350 is in an assembled position relative to the rear cover 180. For example, the outer surface 360*e* may be spaced from the first side 352*c* of the plate member 352 such that the distance D3 is approximately equal to (e.g., slightly shorter than) a thickness of a corresponding side wall 183 of the rear cover 180. The inner edge 360*b* of the flange member 360 may be spaced from the base 360*a* a distance D4 along the transverse direction T such that the inner edge 360*b* extends substantially to the rear wall 184 of the rear cover 180 when the yoke 350 is attached to the rear cover 180. The base 360*a*, inner edge 360*b*, and the upper and lower edges 360*c*, 360*d* may define a perimeter of the flange member 360.

The base 360*a* of the illustrated flange member 360 extends along a portion of the first side 352*c* of the plate member 352 between the upper and lower ends 352*a*, 352*b* and the inner edge 360*b* extends substantially parallel to the longitudinal direction L. The upper and lower edges 360*c*, 360*d* have respective first portions and second portions. The first portions extend between the base 360*a* and the second portions, and are angularly offset with respect to each other and with respect to the transverse direction T, such that the flange member 360 is tapered between the base 360*a* and the second portions. The second portions extend substantially parallel to the transverse direction T between the first portions and the inner edge 360*b*.

The flange member 360 may be configured to enable the attachment of one or more electrical components of the load control device 102, for example to enable the attachment of one or more semiconductor power devices (e.g., controllably conductive devices, such as triacs, FETs, or the like) to the flange member 360 rather than to the PCB 170 (e.g., the first or second surfaces 170*a*, 170*b* of the PCB 170). The flange member 360 may define one or more apertures 362 configured to receive respective fasteners of one or more electrical components that are mounted to the flange member 360. The one or more apertures 362 may extend through the flange member 360, for example along a direction that is substantially normal to the outer and inner surfaces 360*e*, 360*f*. For example, the illustrated flange member 360 defines four apertures 362 that are substantially aligned with one another along the longitudinal direction L.

The illustrated apertures 362 allow the mounting of up to four semiconductor power devices (e.g., four triacs) to the flange member 360. A semiconductor power device may be secured to the flange member 360 using a select one of the apertures 362 and may be electrically connected to the PCB 170, for example by soldering the semiconductor power device to one or more electrical circuits defined on the second surface 170*b* of the PCB 170. With the yoke 350 in an assembled position relative to the rear cover 180, semiconductor power devices attached to the flange member 360 may be enclosed by the rear cover 180 and the plate member 352 of the yoke 350, such that the semiconductor power devices are housed within the load control device 102. One or more semiconductor power devices may be attached to the flange member 360 in desired positions, for example using one or more of the apertures 362. In this regard, the load control device 102 may be configured to house a variable number of semiconductor power devices.

Mounting one or more semiconductor power devices to the flange member 360 rather than to the yoke 350, allows for flexibility and modularity in configuring the load control device 102 in accordance with different applications (e.g., configurations). Moreover, if fewer than four semiconductor power devices are specified for a particular configuration of the load control device 102 (e.g., a load control device 102 having one triac), any one of the four apertures 362 may be selected for use in securing the triac.

The flange member 360 may dissipate heat generated by one or more semiconductor power devices secured to the flange member 360. For example, heat generated by a semiconductor power device secured to the flange member 360 may be conducted into the flange member 360 and through the plate member 352 to one or both of the upper and lower tab members 358*a*, 358*b*.

The flange member 360 may be integral, for example monolithic, with the plate member 352 or may be separate from the plate member 352 and attached thereto. For example, the flange member 360, the upper and lower tab members 358*a*, 358*b*, and the plate member 352 may be monolithic, such that the yoke 350 may be made from a single piece of material. The yoke 350 may be stamped from a piece of a substantially flat piece of sheet metal. The upper and lower tab members 358*a*, 358*b* and the flange member 360 may be formed by bending respective portions of the sheet metal. Apertures of the yoke 350, for instance the apertures 352, may be punched, drilled, or otherwise defined in the sheet metal of the yoke 350, for example before the upper and lower tab members 358*a*, 358*b* and the flange member 360 are bent into position.

Figure 5C:
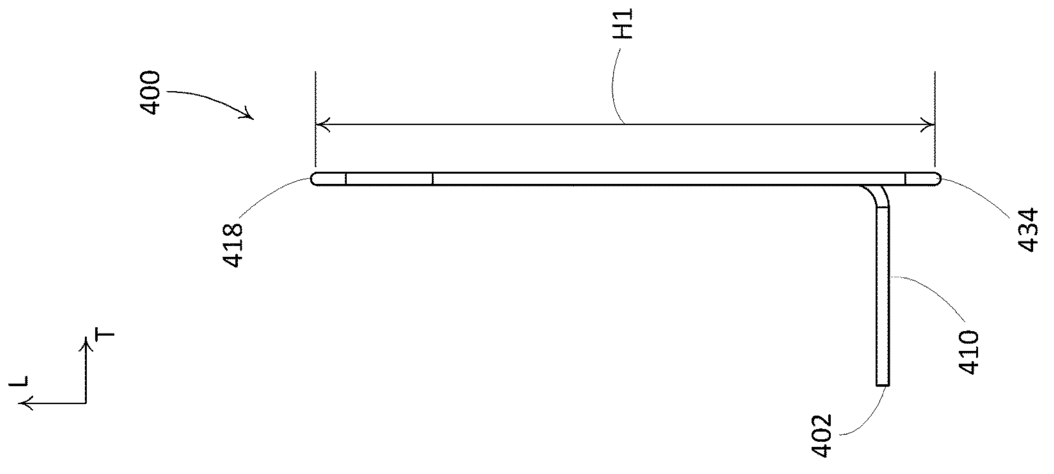
FIG. 5C is a left side elevation view of the antenna illustrated in FIG. 5A.
Figure 5B:
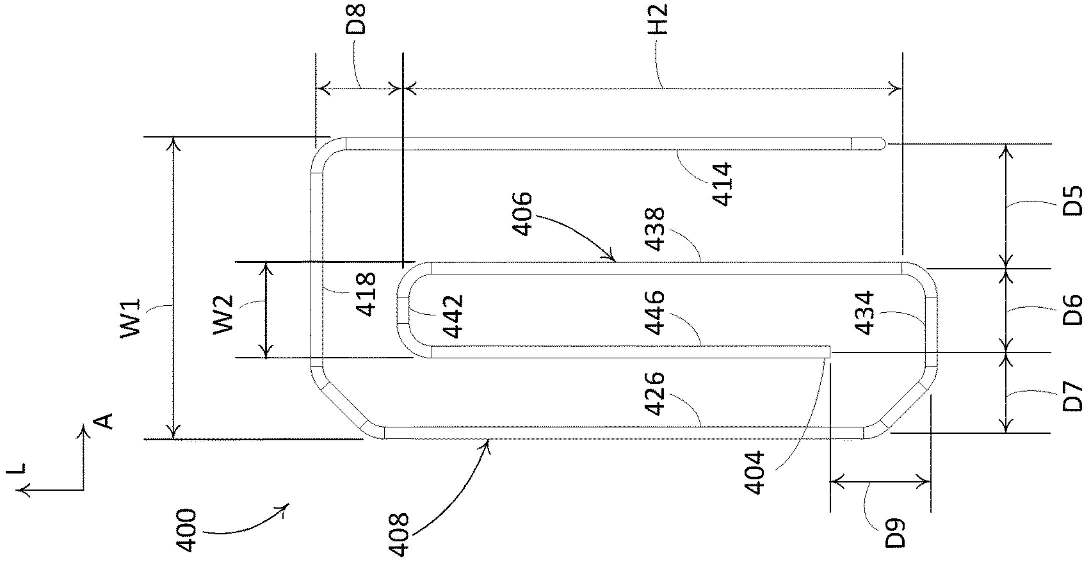
FIG. 5B is a front elevation view of the antenna illustrated in FIG. 5A.
Figure 5A:
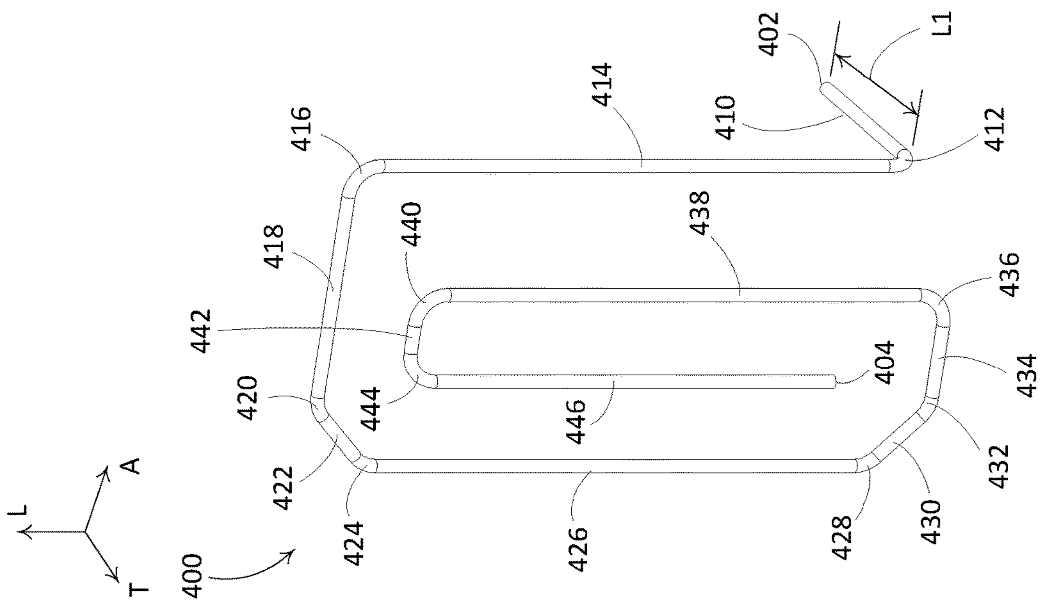
FIG. 5A is a perspective view of an antenna of the load control device illustrated in FIG. 2.

FIGS. 5A-5C depict an example antenna 400 that may be used by the load control device 102 for wireless communication, for example for wireless communication between the load control device 102 and one or more components of the load control system (e.g., the occupancy sensor 114, the daylight sensor 116, the remote control unit 118, etc.). The antenna may be made of any suitable material, such as metal. The antenna 400 may be made from a length of wire having a first end 402 that is configured to be attached to the PCB 170 and a free second end 404. The first end 402 may be attached to the PCB 170, for instance may by soldering the first end 402 to a corresponding electrical contact disposed on the first surface 170*a* of the PCB 170, so as to place the antenna 400 in electrical communication with the PCB 170.

The antenna 400 may be configured as a formed monopole antenna (e.g., a bent or articulated monopole antenna) having two loops, including a first, inner loop 406 (e.g., an inner bend) and a second, outer loop 408 (e.g., an outer bend) that at least partially surrounds the inner loop 406, including the second end 404. The shape of the antenna 400, including the inner and outer loops 406, 408 may be defined by a number of distinct sections. For example, the illustrated antenna 400 includes a first section 410 that extends from the first end 402 along a direction that is substantially parallel to the transverse direction T to a first bend 412. The first section 410 may define a length L1 along the transverse direction T such that the inner and outer loops 406, 408 are spaced a predetermined distance from the first surface 170*a* of the PCB 170.

The outer loop 408 may begin with the first bend 412. The first bend 412 is approximately ninety degrees. A second section 414 of the antenna extends upward from the first bend 412 along a direction that is substantially parallel to the longitudinal direction L to a second bend 416. The second bend 416 is approximately ninety degrees. A third section 418 of the antenna 400 extends from the second bend 416 along a direction that is substantially parallel to the lateral direction A to a third bend 420. The third bend 420 is approximately forty five degrees. A relatively short fourth section 422 extends along a direction that is angularly offset with respect to both the lateral direction A and the transverse direction T, between the third bend 420 and a fourth bend 424. The fourth bend 424 is approximately forty five degrees. A fifth section 426 extends downward from the fourth bend 424 along a direction that is substantially parallel to the longitudinal direction L to a fifth bend 428, such that the fifth section 426 is substantially parallel to the second section 414. The fifth bend 428 is approximately forty five degrees. A relatively short sixth section 430 extends along a direction that is angularly offset with respect to both the lateral direction A and the transverse direction T, from the fifth bend 428 to a sixth bend 432. The sixth bend 432 is approximately forty five degrees. A seventh section 434 of the antenna 400 extends from the sixth bend 432 along a direction that is substantially parallel to the lateral direction A to a seventh bend 436, where the outer loop 408 may end. The seventh section 434 is substantially parallel to and shorter than the third section 418.

The inner loop 406 may begin with the seventh bend 436. The seventh bend 436 is approximately ninety degrees. An eighth section 438 extends upward from the seventh bend 436 along a direction that is substantially parallel to the longitudinal direction L to an eighth bend 440, such that the eighth section 438 is substantially parallel to both the second section 414 and the fifth section 426. The eighth bend 440 is approximately ninety degrees. A ninth section 442 extends from the eighth bend 440 along a direction that is substantially parallel to the lateral direction A to a ninth bend 444. The ninth bend 444 is approximately ninety degrees. The ninth section 442 is substantially parallel to and shorter than the seventh section 434. A tenth section 446 extends downward from the ninth bend 444 along a direction that is substantially parallel to the longitudinal direction L to the second end 404, such that the tenth section 446 is substantially parallel to the second section 414, the fifth section 426, and the eighth section 438.

The outer loop 408 of the antenna 400 may have a first height H1 defined by the third section 418 and the seventh section 434, and a first width W1 defined by the second section 414 and the fifth section 426. The inner loop 406 of the antenna 400 has a second height H2 defined by the seventh bend 436 and the ninth section 442 and a second width W2 defined by the eighth section 438 and the tenth section 446. The second height H2 may be shorter than the first height H1 and the second width W2 may be narrower than the first width W1, such that the inner loop 406 is defined substantially within the outer loop 408 and may be said to be at least partially enclosed by the outer loop 408.

Wireless communication performance of the antenna 400 (e.g., a tuned frequency of the antenna) was found to be tunable in accordance with structural characteristics of the antenna 400, including one or more of the following: an overall length of the wire of the antenna 400 (e.g., as defined by the first end 402 and the second end 404; spacing between adjacent segments of the inner and outer loops 406, 408; a spacing between the inner and outer loops 406, 408 of the antenna 400 and the outer surface 302*e* of the plate member 302, as described elsewhere herein; and respective locations and angles of the bends. A desired level of wireless communication performance was achieved when the second section 414 is spaced a distance D5 from the eighth section 438 along the lateral direction A, the eighth section 438 is spaced a distance D6 from the tenth section 446 along the lateral direction A, the tenth section 446 is spaced a distance D7 from the fifth section 426 along the lateral direction A, the third section 418 is spaced from the ninth section 442 a distance D8 along the longitudinal direction L, and the second end 404 is spaced from the seventh section 434 a distance D9 along the longitudinal direction L, wherein D5 is longer than both D6 and D7, respectively, but shorter than a sum of D6 and D7, and wherein D8 is approximately equal to, for example slightly shorter than, D9.

Both the inner and outer loops 406, 408 may be substantially coplanar relative to each other and substantially coplanar with respect to a plane defined by the longitudinal direction L and the lateral direction A. It should be appreciated that the antenna 400 of the load control device 102 is not limited to the illustrated geometry, and that the antenna 400 may be alternatively constructed. The antenna may alternatively define more or fewer segments, more or fewer bends of the same or different angles, more or fewer loops that may or may not partially enclose one another, loops defined in planes that are partially or completely noncoplanar with respect to each other, and so on, for example to accommodate different button configurations.

FIGS. 6A-6D depict an example partial assembly of the load control device 102, with the yoke 300. The yoke 300 and the antenna 400 are depicted in assembled positions relative to each other. Other components of an assembled load control device 102, for example as depicted in FIG. 2, are omitted from FIGS. 6A-6D in order to more clearly illustrate the location and orientation of the antenna 400 with respect to the yoke 300 in an assembled load control device 102. In an assembled load control device 102, the antenna 400 may be at least partially supported in its installed position relative to the yoke 300 by one or both of a physical connection established between the first end 402 and the PCB 170 (e.g., a solder joint) and one or more physical connections established between the antenna 400 and the cradle 150, as described elsewhere herein.

In an assembled position relative to the yoke 300, one or more portions of the antenna 400, such as respective sections and bends of the outer loop 408, may be spaced from corresponding portions of the perimeter 306 of the opening 304 along the lateral direction A and/or the longitudinal direction L. With the first end 402 of the antenna 400 attached to the PCB 170 and the PCB 170 and the yoke 300 attached to the rear cover 180, at least a portion of the first section 410 of the antenna may protrude through the opening 304 of the plate member 302, such that the inner and outer loops 406, 408 of the antenna 400 are spaced from the outer surface 302*e* of the plate member 302 a distance D10. The distance D10 was found to be an important characteristic in tuning the antenna 400 to achieve the desired level of wireless communication performance of the load control device 102.

The load control device 102 may be mounted to a metal or plastic wallbox and one or more components of the faceplate assembly 130 (e.g., the adapter 131 and the faceplate 132) may be made of metal or plastic. The load control device 102 may be configure such that an impedance of the antenna 400, and thus a transmission and/or a reception range of the antenna 400 may be substantially consistent over various installation conditions. When the load control device 102 is installed in a metal wallbox or with a faceplate assembly 130 made of metal, electric fields produced when the antenna 400 is transmitting may cause current to flow through the metal wallbox and/or through the metal faceplate assembly in a loop.

However, when the load control device 102 is installed in a plastic wallbox and with a faceplate assembly 130 made of plastic, the current may not flow in a loop, for example because of the opening 304. To account for such a condition, the load control device 102 may include an electrically conductive shorting member, for example an electrically conductive shorting wire 314 that may be attached to the yoke 300 (e.g., to the plate member 302) so as to complete a "ring" around the opening 304, such that current is able to flow in a loop through the yoke 300, for example when the antenna 400 is transmitting. Respective portions of the shorting wire 314 may be disposed into corresponding ones of the channels 309 and secured therein (e.g., using solder).

Figure 7C:
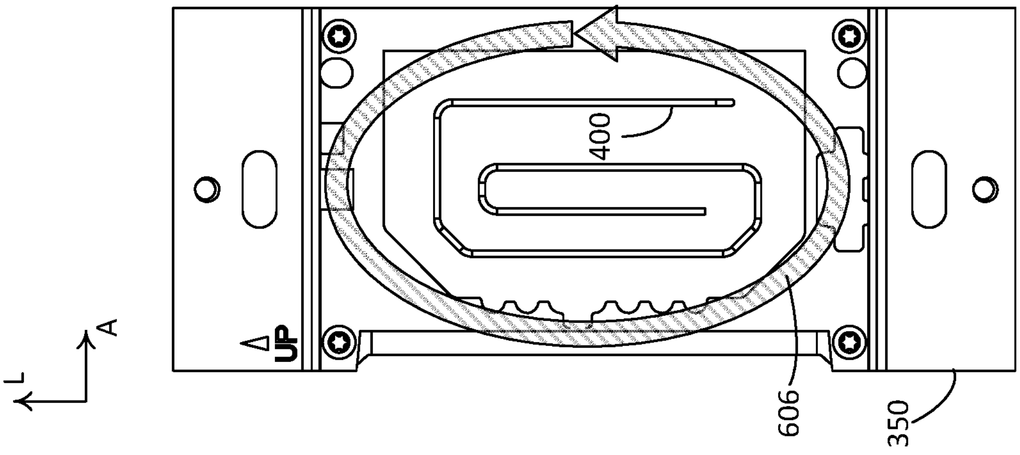
FIG. 7C is a front elevation view depicting an example electron flow through the yoke illustrated in FIGS. 4A-4C.
Figure 7B:
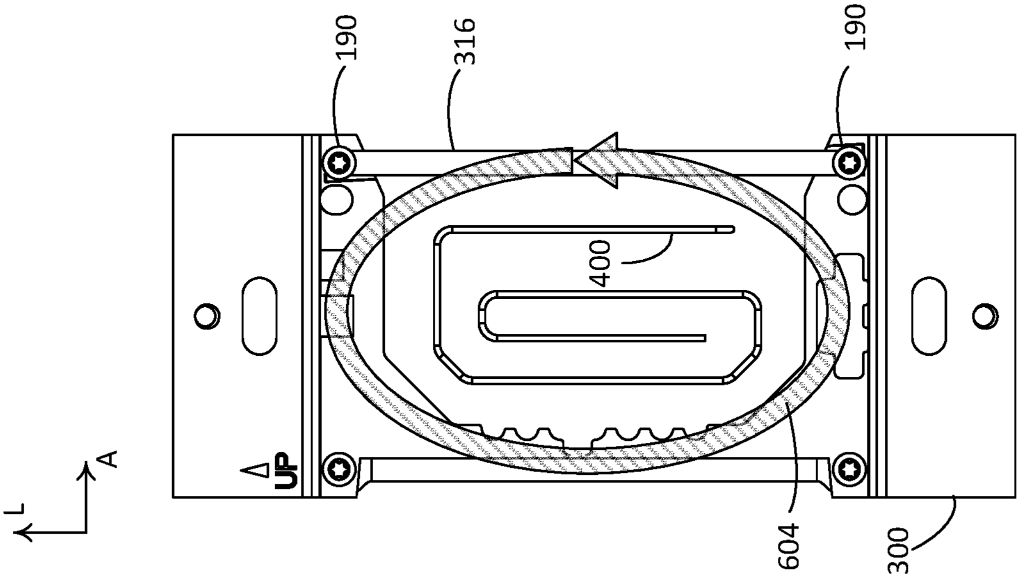
FIG. 7B is a front elevation view depicting an example electron flow through the yoke illustrated in FIGS. 3A-3C when the load control device is assembled with the electrically conductive strap.
Figure 7A:
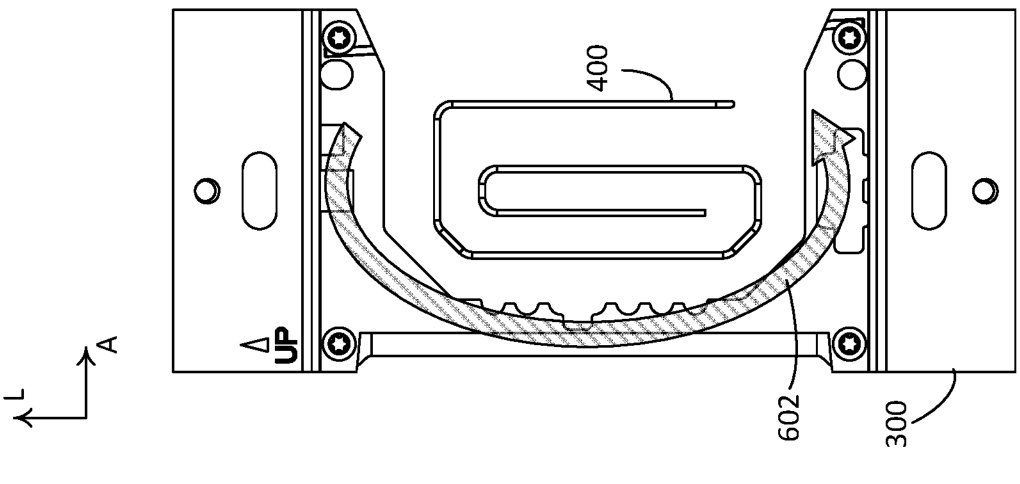
FIG. 7A is a front elevation view depicting an example electron flow through the yoke illustrated in FIGS. 3A-3C when the load control device is assembled without the electrically conductive strap.

FIGS. 7A and 7B illustrate current flow around the yoke 300 without and with a shorting member installed. The shorting wire 314 illustrated in FIGS. 6A and 6B is replaced with an electrically conductive shorting strap 316. It was found that the shorting wire 314 and the shorting strap 316 may be used interchangeably with the yoke 300 to achieve substantially the same effect with regards to current flow around the yoke 300. The illustrated shorting strap 316 may be secured to the plate member 302, for example, via screws 190 that also secure one or more of the yoke 300, the cradle 150, and the PCB 170 to the rear cover 180.

When the load control device 102 does not include a shorting member and is installed in a plastic wallbox with a faceplate assembly 130 made of plastic, current flow through the yoke 300 (e.g., through the plate member 302) is disrupted, as illustrated by the flow path 602 shown in FIG. 7A. When a shorting member, for example the shorting strap 316, is attached to the plate member 302, as depicted in FIG. 7B, current flow through the yoke 300 (e.g., through the plate member 302) is not disrupted, as illustrated by the flow path 604. This may also be the case when the load control device 102 does not include a shorting member and is installed in a metal wallbox or with a faceplate assembly 130 made of metal. Therefore, the shorting member may ensure that current may flow through the yoke 300 (e.g., by establishing the flow path 604) and that the impedance of the antenna 400 remains relatively constant independent of a type of wallbox to which the load control device 102, with the yoke 300, is mounted and/or a type of faceplate attached to the load control device 102. FIG. 7C illustrates an example current flow through the yoke 350. As shown, the current flow through the yoke 350 (e.g., through the plate member 352) is not disrupted, as illustrated by the flow path 606. The impedance of the antenna 400, when used with the yoke 305, may remain relatively constant independent of a type of wallbox to which the load control device 102, with the yoke 350, is mounted and/or a type of faceplate attached to the load control device 102.

The tolerances of the electrical components of the RF communication circuit mounted to the PCB 170 may also affect the wireless communication performance of the antenna 400 by causing the communication frequency f RF to move away from the tuned frequency of the antenna 400. However, the structure of the antenna 400 provides a low Q-factor, such that slight changes in the communication frequency f RF do not greatly affect the magnitude of the RF signals transmitted by the RF communication circuit (i.e., the antenna has a relatively flat gain curve). Therefore, the antenna 400 may not need to be fine-tuned during manufacturing of the load control device 102 (e.g., to bring the communication frequency f RF back towards the tuned frequency of the antenna 400), and the RF communication circuit may be operable to more consistently transmit the RF signals in a variety of installations (e.g., with plastic or metal wallboxes or with plastic or metal faceplate assemblies).

Referring now to FIGS. 8A-8B and 9A-9C, the PCB 170 may include one or more switches 174 that are mounted to the first surface 170*a* of the PCB 170 and are electrically connected to corresponding electrical circuits of the PCB 170, such that activation of a select one of the one or more switches 174 may control one or more functions of the load control device 102. The illustrated PCB 170 has five switches disposed on the first surface 170*a* of the PCB 170, including a first switch 174*a*, a second switch 174*b*, a third switch 174*c*, a fourth switch 174*d*, and a fifth switch 174*e*.

The button assembly 140 may include a frame 142 that may define any suitable shape, such as substantially rectangular. The frame 142 may be configured to support one or more buttons 144 that may be depressed to control corresponding functions of the load control device 102 when the button assembly 140. The frame 142 of the illustrated button assembly 140 supports five buttons 144, including a first button 144*a*, a second button 144*b*, a third button 144*c*, a fourth button 144*d*, and a fifth button 144*e*. Each of the buttons 144 may be depressed to activate a corresponding switch 174 on the PCB 170, as described elsewhere herein.

The button assembly 140 may include one or more attachment members configured to engage with complementary engagement members of one or more other components of the load control device 102, such that the button assembly 140 may be supported independently of the yoke 300. For example, the button assembly 140 may have one or more attachment members designed to engage with complementary engagement members of the cradle 150, for example such that the button assembly is supported directly by the cradle 150. If the button assembly 140 is supported independently of the yoke 300, deformation of the button assembly 140 that may cause one or more of the buttons 144 to fail to operate properly (e.g., deformation of the frame 142) may be mitigated. The button assembly 140 may include one or more attachment members, for example one or more resilient cantilevered latches 146 and one or more rigid posts 148, that are configured to be received by complementary engagement members of the cradle 150, as described elsewhere herein. The illustrated button assembly may include three latches 146 (only two are depicted) and two posts 148 that extend inward from the frame 142 along a direction that is substantially parallel to the transverse direction T.

The cradle 150 includes a base 152 that may have any suitable shape, such as the illustrated substantially rectangular, plate shape. The base 152 defines an upper end 152*a*, an opposed lower end 152*b* that is spaced from the upper end 152*a* along the longitudinal direction L, opposed first and second sides 152*c*, 152*d* that are spaced from each other along the lateral direction A, and opposed outer and inner surfaces 152*e*, 152*f* that are spaced from each other along the transverse direction T. The base 152 may define a channel 151 along the second side 152*d* that is configured to receive at least a portion of the antenna shorting wire 314. Opposed ends of the channel 151 may substantially align with the channels 309 defined by the yoke 300 when the cradle 150 is attached to the yoke 300.

A spacing of the upper end 152*a* from the lower end 152*b* along the longitudinal direction L may be substantially equal to a spacing from the upper end 302*a* of the plate member 302 of the yoke 300 to the lower end 302*b* along the longitudinal direction L, and a spacing from the first side 152 to the second side 152*d* along the lateral direction A may be substantially equal to a spacing from the second side 302*d* to the inner surface 310*f* of the flange member 310 along the lateral direction A. The outer surface 152*e* of the base 152 may be configured to contact at least a portion of the inner surface 302*f* of the plate member 302 when the cradle 150 and the yoke 300 are in an assembled position relative to each other.

The cradle 150 may include one or more walls 154 that extend rearward from the inner surface 152*f* of the base 152, for example along a direction substantially parallel to the transverse direction T. For example, the cradle 150 may include walls 154 that, in combination with the base 152, define a protective enclosure over electrical components attached to the first surface 170*a* of the PCB 170, such as the switches 174. The walls 154 may include one or more attachment members, such as posts (not shown), that may be received in press fit engagement in corresponding apertures defined in the substrate body of the PCB 170 (e.g., through the substrate body along the transverse direction T), so as to secure the PCB 170 to the cradle 150. One or more portions of the first surface 170*a* of the PCB 170 may abut corresponding edges of the walls 154 when the PCB 170 is attached to the cradle 150.

The cradle 150 may include a projection 156 that extends forward from the outer surface 152*e* of the base 152. The projection 156 may have any suitable shape. The projection 156 may include a front wall 158 that defines an outer perimeter of the projection 156 and a perimeter wall 160 that extends from the front wall 158 to the outer surface 152*e* of the base 152 along substantially an entirety of the outer perimeter of the front wall 158. The front wall 158 and the perimeter wall 160 may define a cavity configured to at least partially receive the antenna 400, as described elsewhere herein.

The perimeter wall 160 of the illustrated projection 156 defines an upper section 160*a* that extends along the lateral direction A, a lower section 160*b* that extends along the lateral direction A and is spaced from the upper section 160*a* along the longitudinal direction L, opposed first and second side sections 160*c*, 160*d* that are spaced from each other along the lateral direction A, a first angled section 160*e* that is angularly offset with respect to both the longitudinal direction L and the lateral direction A and extends from the upper section 160*a* to the first side section 160*c*, and a second angled section 160*f* that is angularly offset with respect to both the longitudinal direction L and the lateral direction A and extends from the lower section 160*b* to the first side section 160*c*.

As shown, the perimeter wall 160 substantially conforms to the shape of the opening 304 in the plate member 302 of the yoke 300, such that when the cradle 150 is attached to the yoke 300, the upper and lower sections 160*a*, 160*b*, the first side sections 160*c*, and the first and second angled sections 160*e*, 160*f*, fit closely to corresponding portions of the perimeter 306 of the opening 304 and the projection 156 protrudes forward from the opening 304 along the transverse direction T. The perimeter wall 160 substantially conforms to the shape of the opening 354 in the plate member 352 of the yoke 350, such that when the cradle 150 is attached to the yoke 350, the upper and lower sections 160*a*, 160*b*, the first side sections 160*c*, and the first and second angled sections 160*e*, 160*f*, fit closely to corresponding portions of the perimeter 356 of the opening 354 and the projection 156 protrudes forward from the opening 354 along the transverse direction T.

The cradle 150 may include one or more activation members configured to transmit a force applied to a button 144 of the button assembly 140 to a corresponding switch 174 of the PCB 170. For example, the illustrated cradle 150 includes five cantilevered button paddles 162 defined in the front wall 158 of the projection 156. Each button paddle 162 has a base end 161 that is anchored in the front wall 158 and an opposed free end 163 that is movable, for example along the transverse direction T, with respect to the base end 161.

The free end 163 of each of the illustrated button paddles 162 supports a post 164 that extends rearward from the free end 163 along the transverse direction T and is configured to activate a corresponding switch 174 disposed on the PCB. When a button 144 of the button assembly 140 is depressed, a portion of the button 144 will make contact with a corresponding button paddle 162 and cause the button paddle 162 to be biased inward along the transverse direction T, such that the post 164 of the button paddle causes a corresponding switch 174 disposed on the PCB 170 to be activated.

The illustrated cradle 150 has five button paddles 162 defined in the front wall 158. A first button paddle 162*a* is defined proximate the upper section 160*a* of the perimeter wall 160. The base end 161 of the first button paddle 162*a* is located proximate an intersection of the upper section 160*a* and the second side section 160*d*. The free end 163 of the first button paddle 162*a* is spaced from the base end 161 along the lateral direction A and is substantially aligned with the base end 161 along the longitudinal direction L. The first button paddle 162*a* is configured to be biased inwardly by the first button 144*a*, thereby activating the first switch 174*a*.

A second button paddle 162*b* is defined proximate to the lower section 160*b* of the perimeter wall 160. The base end 161 of the second button paddle 162*b* is located proximate an intersection of the lower section 160*b* and the second side section 160*d*. The free end 163 of the second button paddle 162*b* is spaced from the base end 161 along the lateral direction A and is substantially aligned with the base end 161 along the longitudinal direction L. The second button paddle 162*b* is configured to be biased inwardly by the second button 144*b*, thereby activating the second switch 174*b*.

A third button paddle 162*c* is defined proximate the first side section 160*c* of the perimeter wall 160. The base end 161 of the third button paddle 162*c* is located nearer the lower section 160*b* of the perimeter wall 160 than the upper section 160*a*. The free end 163 of the third button paddle 162*c* is spaced from the base end 161 along the longitudinal direction L and is substantially aligned with the base end 161 along the lateral direction A. The third button paddle 162*c* is configured to be biased inwardly by the third button 144*c*, thereby activating the third switch 174*c*.

A fourth button paddle 162*d* is defined proximate the second side section 160*d* of the perimeter wall 160. The base end 161 of the fourth button paddle 162*d* is located nearer the upper section 160*a* of the perimeter wall 160 than the lower section 160*b*. The free end 163 of the fourth button paddle 162*d* is spaced from the base end 161 along both the longitudinal direction L and the lateral direction A. The fourth button paddle 162*d* is configured to be biased inwardly by the fourth button 144*d*, thereby activating the fourth switch 174*d*.

A fifth button paddle 162*e* is defined between the third and fourth button paddles 162*c*, 162*d*. The base end 161 of the fifth button paddle 162*e* is located nearer the upper section 160*a* of the perimeter wall 160 than the lower section 160*b*. The free end 163 of the fifth button paddle 162*e* is spaced from the base end 161 along the longitudinal direction L and is substantially aligned with the base end 161 along the lateral direction A. The fifth button paddle 162*e* is configured to be biased inwardly by the fifth button 144*e*, thereby activating the fifth switch 174*e*.

Figure 9A:
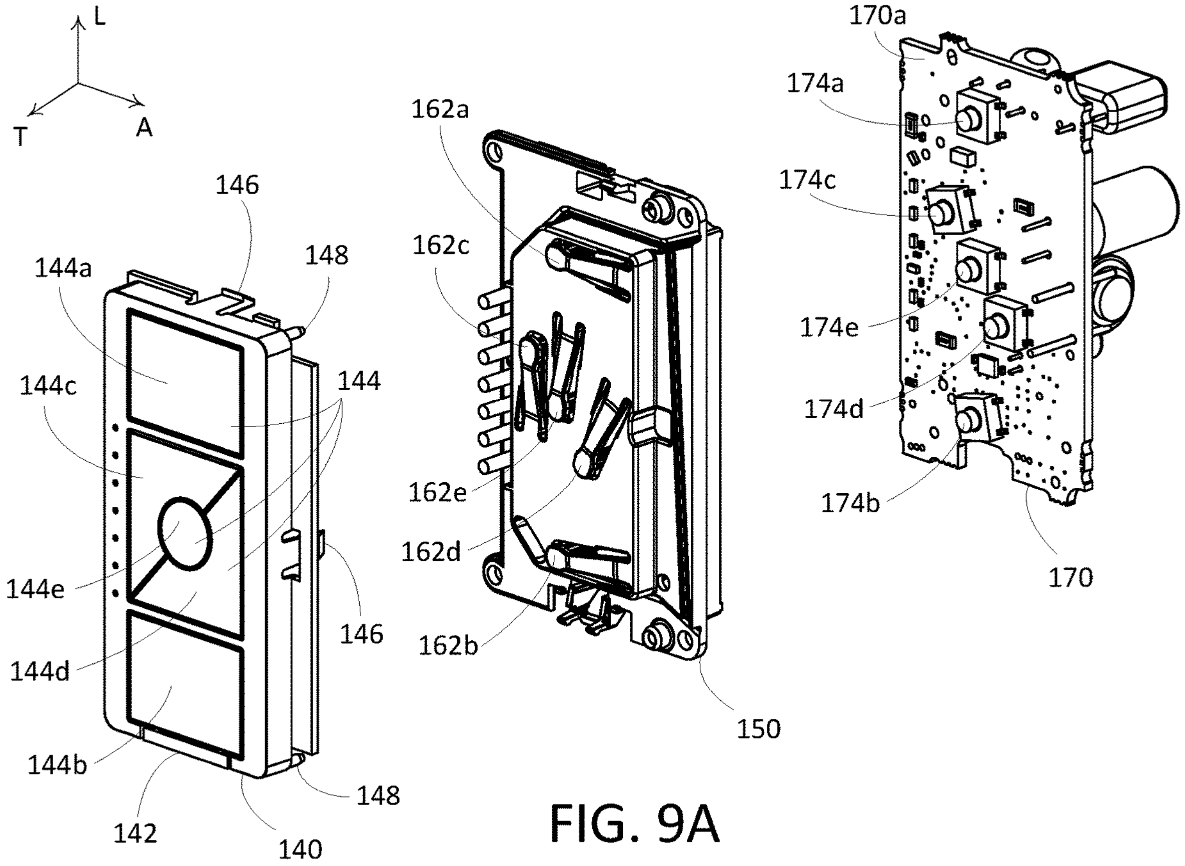
FIG. 9A is a perspective exploded view including the cradle illustrated in FIG. 8A and Printed Circuit Board (PCB) and button assembly components of the load control device illustrated in FIG. 1.
Figure 9B:
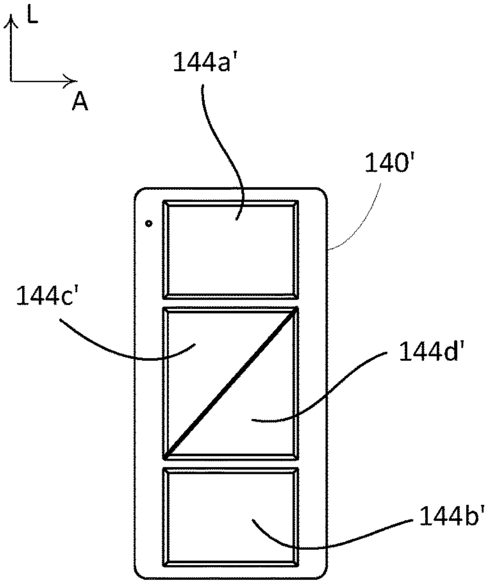
FIG. 9B is a front elevation view of an alternative button assembly that may be substituted for the button assembly illustrated in FIG. 9A.

The cradle 150 may function with button assemblies other than the illustrated button assembly 140, such as button assemblies having more or fewer buttons than the button assembly 140. For example, a first alternative button assembly 140' that may be used with the cradle 150 is illustrated in FIG. 9B. The button assembly 140' may be constructed substantially similarly to the button assembly 140, but with only four buttons, including a first button 144*a'* that operates similarly to the first button 144*a*, a second button 144*b'* that operates similarly to the second button 144*b*, a third button 144*c'* that operates similarly to the third button 144*c*, and a fourth button 144*d'* that operates similarly to the fourth button 144*d*.

Figure 9C:
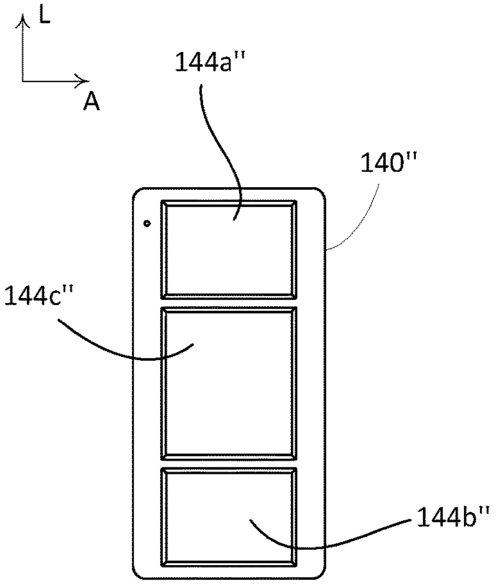
FIG. 9C is a front elevation view of another alternative button assembly that may be substituted for the button assembly illustrated in FIG. 9A.

A second alternative button assembly 140" that may be used with the cradle 150 is illustrated in FIG. 9C. The button assembly 140" may be constructed substantially similarly to the button assembly 140 and the button assembly 140', but with only three buttons, including a first button 144*a"* that operates similarly to the first button 144*a*, a second button 144*b"* that operates similarly to the second button 144*b*, and a third button 144*c'* that operates similarly to the fifth button 144*e*. In this regard, the cradle 150 may accommodate a plurality of button configurations. Accordingly, the load control device 102 may be configured with a plurality of different button configurations.

The cradle 150 allows for flexibility and modularity in configuring the load control device 102. For example, a button assembly (e.g., the button assembly 140, 140', 140", etc.) may be selected for use with the cradle 150 based, for example, upon a desired number of functions of the load control device 102 that will be controlled by the buttons of the button assembly. It should be appreciated that the load control device 102 is not limited to the button assemblies illustrated in FIGS. 9A-9C, and that button assemblies with more or fewer buttons may be constructed for use with the cradle 150.

Figure 8B:
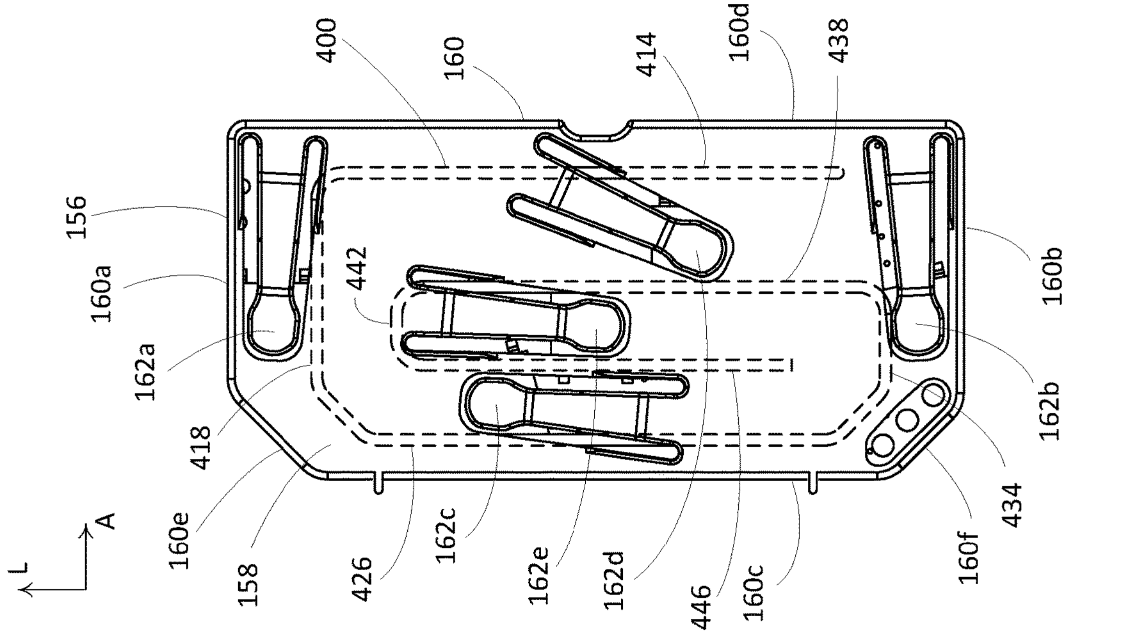
FIG. 8B is a front elevation view of a portion of the cradle illustrated in FIG. 8A, with the antenna attached to the cradle.
Figure 8A:
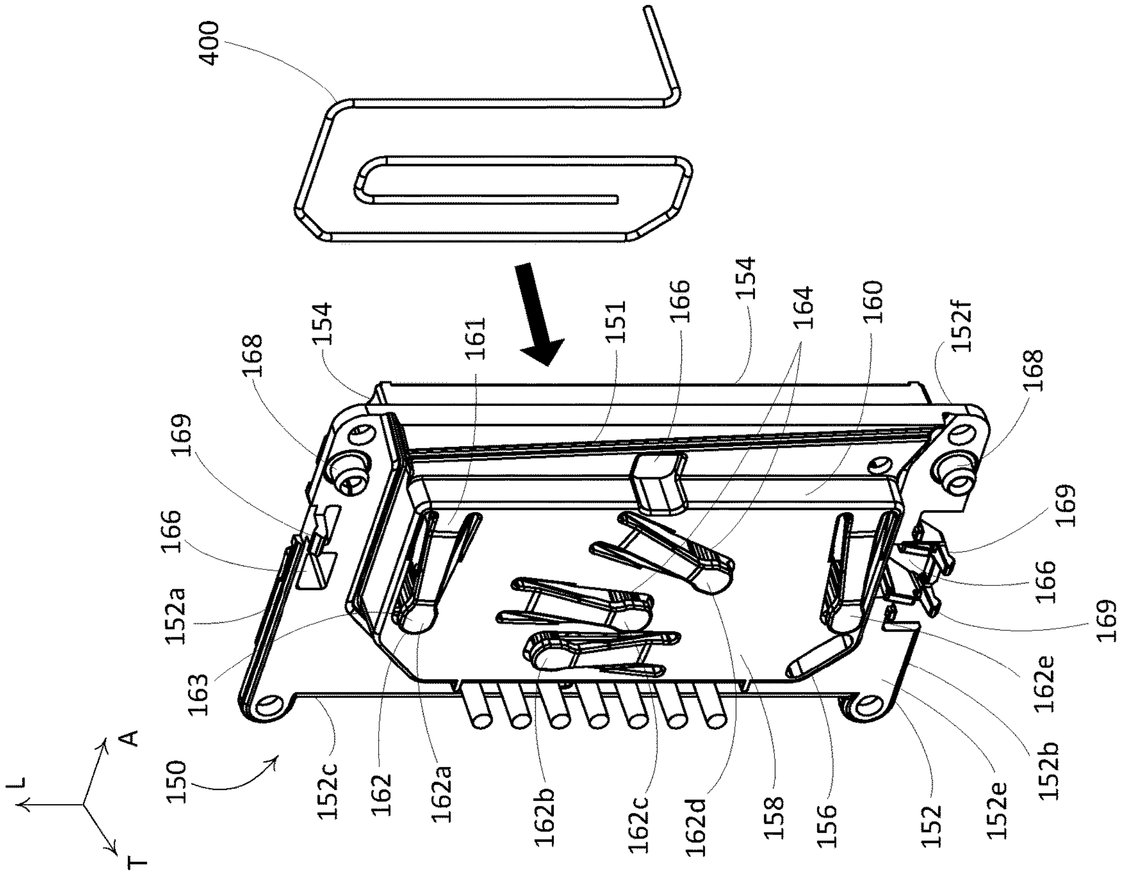
FIG. 8A is a perspective view of a cradle component of the load control device illustrated in FIG. 2 and the antenna illustrated in FIGS. 5A-5C.

The cradle 150 may be configured to receive at least a portion of the antenna 400. The outer and inner loops 408, 406 of the antenna 400 may be received in the cavity of the projection 156 such that the outer and inner loops 408, 406 do not interfere with operation of any of the button paddles 162. For example, the outer and inner loops 408, 406 of the antenna 400 may be disposed in spaces between the posts 164 of the button paddles 162, as illustrated in FIG. 8B.

The antenna 400 may be attached to an inner surface of the front wall 158 of the projection 156. For example, the outer and inner loops 408, 406 of the antenna 400 may be attached to the inner surface of the front wall 158 at one or more locations using a bonding agent. The projection 156 may include an antenna support member (not shown) that extends inward from the inner surface of the front wall 158 along the transverse direction T. The antenna support member may extend, for example, from the inner surface of the front wall 158 to the first surface 170*a* of the PCB 170 when the PCB 170 is attached to the cradle 150. The antenna support member may at least partially enclose a portion of the antenna 400 that it supports, for example the first section 410 of the antenna 400.

The cradle 150 may include one or more sets of attachment members configured to allow the cradle 150 to be attached to one or more other components of the load control device 102. For example, the cradle may include a first set of attachment members configured to engage with complementary attachment members of the button assembly 140 to secure the cradle 150 and the button assembly 140 to one another. The cradle 150 may include a second set of attachment members configured to engage with the yoke 300 to secure the cradle 150 to the yoke 300.

The first set of attachment members includes three apertures 166 that extend through the base 152 of the cradle 150 along a direction that is substantially parallel to the transverse direction T. Each aperture 166 may be configured to received and releasably engage with a corresponding latch 146 of the button assembly 140. The first set of attachment members includes a pair of silos 168 that extend forward from the outer surface 152*e* of the base 152 along the transverse direction T. Each silo 168 may be configured to receive a corresponding post 148 of the button assembly 140 in press fit engagement. The button assembly 140 may be attached to the cradle 150 by aligning the latches 146 with the apertures 166 and the posts 148 are aligned with the silos 168, and then biasing the cradle 150 and the button assembly 140 toward one another along the transverse direction T until each latch 146 snaps into an engaged positions within a respective one of the apertures 166.

The second set of attachment members includes resilient cantilevered latches 169 that extend forward from the outer surface 152*e* of the base 152 along the transverse direction T. Each latch 169 may be configured to be received in and releasably engage with a corresponding aperture 307 defined in the yoke 300. The cradle 150 may be attached to the yoke 300 by aligning the latches 169 with corresponding apertures 307 and then biasing the cradle 150 and the yoke 300 toward one another along the transverse direction T until each latch 169 snaps into an engaged positions within a respective one of the apertures 307. It should be appreciated that the cradle 150 is not limited to the illustrated first and second sets of attachment members, and that the cradle 150 may include any suitable attachment members to facilitate securing the cradle to one or both of the button assembly 140 and the yoke 300, or to another component of the load control device 102.

The cradle 150 may be configured to ease insertion of the cradle 150 into an inserted position within the opening 304 of the yoke 300 along a direction from that is substantially parallel to the lateral direction A (e.g., right to left in FIG. 3B). The cradle 150 may be alternatively constructed without the silos 168 and the latches 169, such that portions of the outer surface 152*e* of the base 152, for example a first portion at least partially bordered by the upper section 160*a* and first angled section 160*e* of the perimeter wall 160 and the upper end 152*a* and first side 152*c* of the base 152 and a second portion at least partially bordered by the lower section 160*b* and second angled section 160*f* of the perimeter wall 160 and the lower end 152*b* and first side 152*c* of the base 152, are substantially smooth. When the cradle 150 is so constructed, the outer surface 152*e* of the base 152 of the cradle 150 may abut and may slide along the inner surface 302*f* of the plate member 302 of the yoke 300 as the cradle 150 is inserted into the opening 304 of the yoke 300 along a direction from that is substantially parallel to the lateral direction A.

Figure 10A:
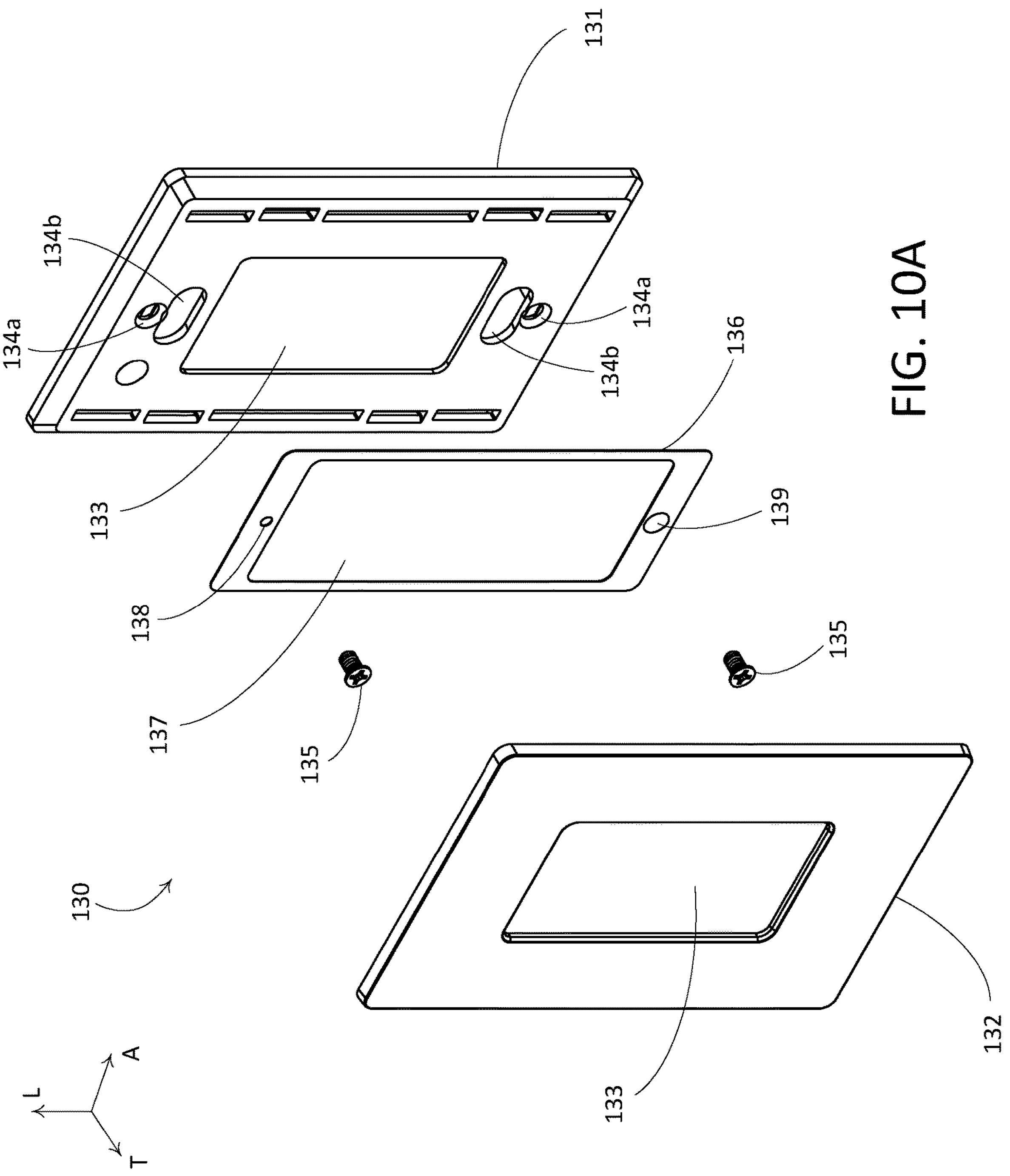
FIG. 10A is a perspective exploded view of the faceplate assembly illustrated in FIG. 2, including an electrically conductive element that may operate to extend a wireless communication range of the antenna.
Figure 10B:
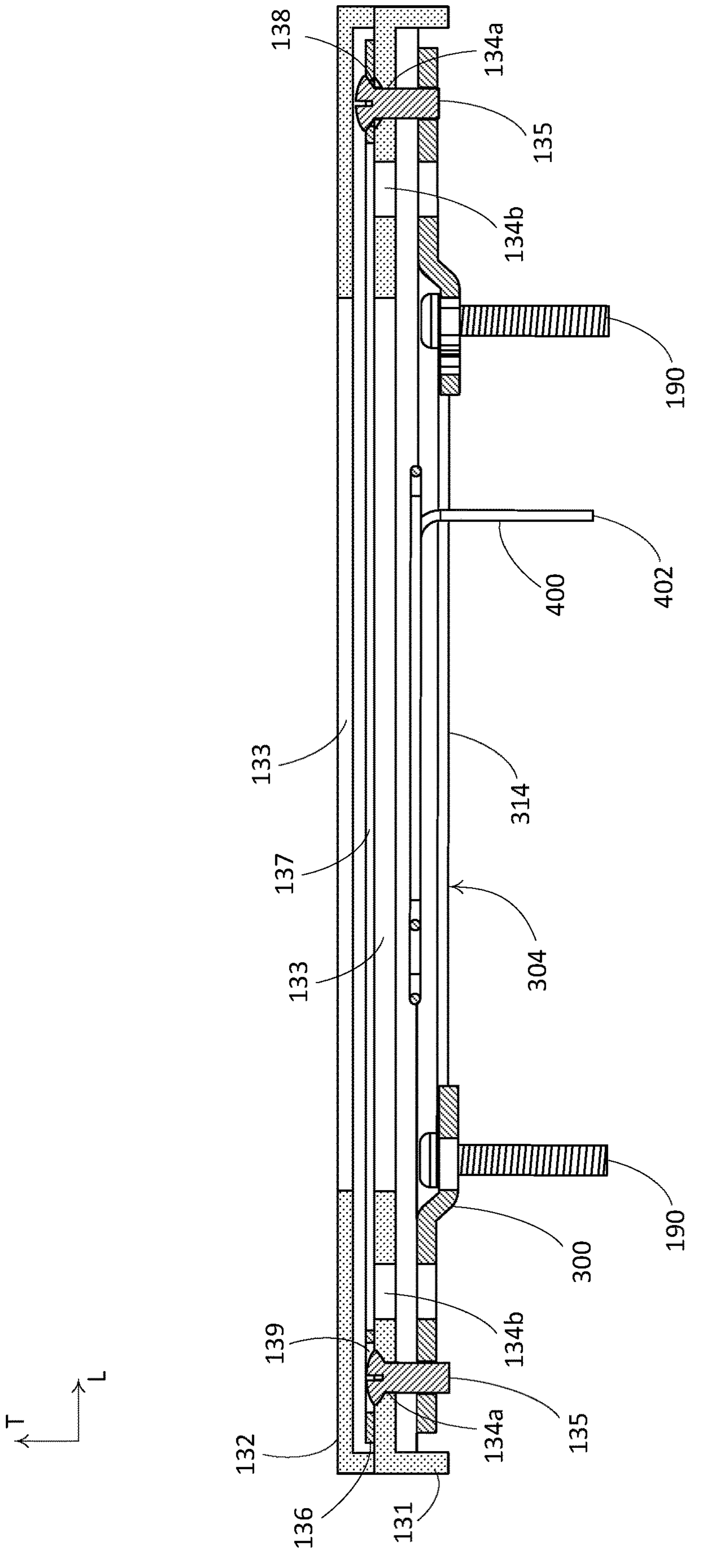
FIG. 10B is a side section view of the antenna assembly illustrated in FIG. 10A and the yoke and antenna illustrated in FIG. 2.
Figure 11B:
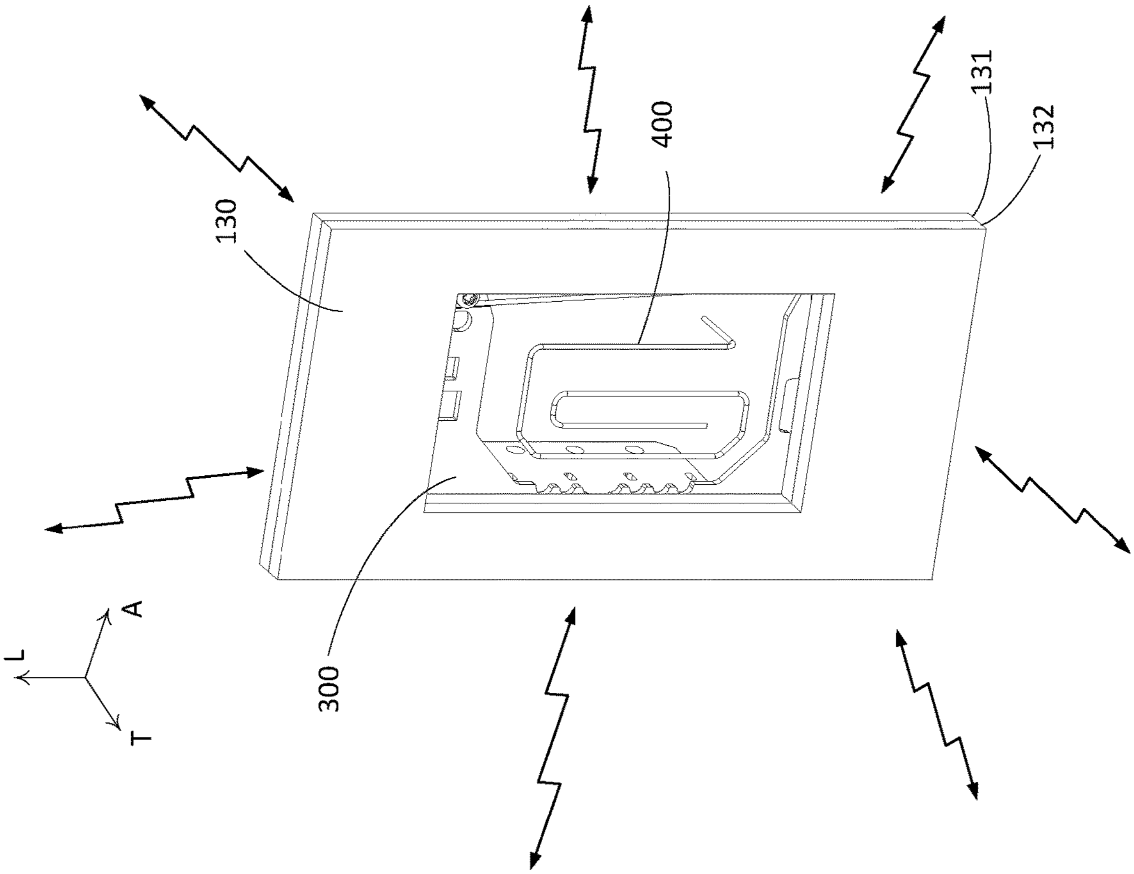
FIG. 11B is a perspective view illustrating wireless communication by the load control device using the antenna assembly illustrated in FIG. 10A.
Figure 11A:
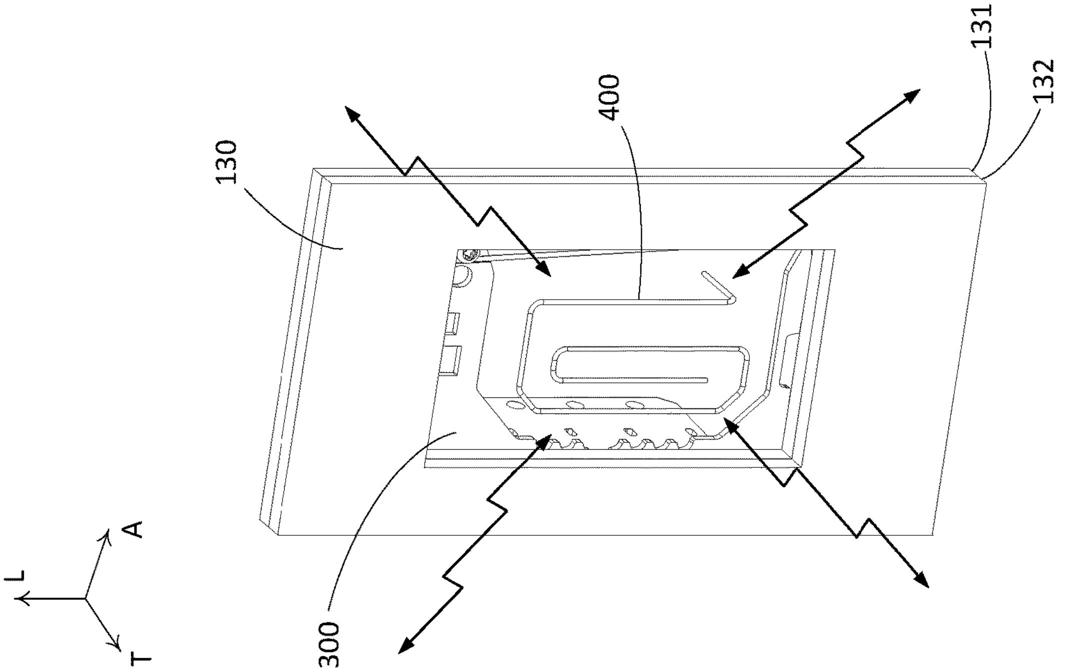
FIG. 11A is a perspective view illustrating wireless communication by the load control device illustrated in FIG. 1 when the faceplate assembly does not include the electrically conductive element illustrated in FIG. 10A.

Referring now to FIGS. 10A-10B and 11A-11B, the faceplate assembly 130 may be configured to enhance one more wireless communication performance characteristics of the load control device 102. FIG. 11A depicts an example of wireless communication of the load control device 102 if the adapter 131 and the faceplate 132 of the faceplate assembly 130 are made of an electrically insulative material, for example plastic. In this configuration, the antenna 400 may provide the load control device 102 with a first wireless transmission range.

The faceplate 130 may be configured to extend the wireless communication range of the load control device 102, for example beyond the first wireless communication range associated with the example configuration of FIG. 11A. In this regard, the faceplate assembly 130 may be referred to as a range extending faceplate assembly.

FIG. 10A illustrates a faceplate assembly 130 that includes an adapter 131 and a faceplate 132 that are both made of an electrically insulative material, such as plastic. The adapter 131 includes a first pair of apertures 134*a* and a second pair of apertures 134*b* that extend through the adapter 131 along a direction that is substantially parallel to the transverse direction T. The first pair of apertures 134*a* is located such that each aperture 134*a* substantially aligns with a corresponding aperture 303 of the yoke 300 when the adapter 131 is attached to the yoke 300. The second pair of apertures 134*b* is located such that each aperture 134*b* substantially aligns with a corresponding aperture 301 of the yoke 300 when the adapter 131 is attached to the yoke 300. The illustrated faceplate assembly 130 includes a pair of screws 135 that may be disposed in the apertures 134*a* and screwed into the apertures 303 of the yoke 300 so as to attach the adapter 131 to the yoke 300. The screws 135 may be made of an electrically conductive material, such as metal. As described elsewhere herein, the faceplate 132 may be configured to attach to the adapter 131, for example once the adapter 131 is secured to the yoke 300.

The illustrated faceplate assembly 130 may further include an electrically conductive member 136 that is configured to be attached to the adapter 131 such that the electrically conductive member 136 is spaced from the yoke 300 along the transverse direction T when the adapter 131 is attached to the yoke 300. The conductive member 136 may be made of any suitable electrically conductive material, such as metal. The conductive member 136 may comprise a metallic label affixed to the adapter 131.

The electrically conductive member 136 may have any suitable shape, such as the illustrated substantially plate like shape. The illustrated electrically conductive member 136 defines any opening 137 that is sized to be larger than the opening 133 defined by the adapter 131 and the faceplate 132. The opening 137 may define an inner perimeter of the electrically conductive member 136 that is spaced from one or more portions of a perimeter defined by the opening 133 when the electrically conductive member 136 is attached to the adapter 131. The illustrated electrically conductive member 136 is sized so as to be enclosed within the faceplate assembly 130 (e.g., covered by the faceplate 132). The illustrated electrically conductive member 136 may be attached to an outer surface 131*a* of the adapter 131. However, the electrically conductive member 136 is not limited to attachment to the outer surface 131*a*. For example, the electrically conductive member 136 may be attached to an inner surface of the adapter 131, embedded within the adapter 131, or otherwise attached supported by the adapter 131 or faceplate 132 as desired.

The electrically conductive member 136 may be configured to be placed in electrical communication with the yoke 300. For example, the electrically conductive member 136 may define a pair of apertures 138, 139 that are located such that each aperture substantially aligns with corresponding apertures 134*a*, 303 of the adapter 131 and the yoke 300, respectively, when the electrically conductive member 136 is attached to the adapter 131 and the adapter 131 is attached to the yoke 300. A first, upper aperture 138 of the pair may be sized such that a first metal screw 135 disposed in the upper aperture 138 and driven into a corresponding aperture 134*a* of the yoke 300 will place the electrically conductive member 136 in electrical communication with the yoke 300. A second, lower aperture 139 of the pair may be sized to be larger than the upper aperture 138, such that when a second metal screw 135 is disposed in the lower aperture 139 and driven into a corresponding aperture 134*a* of the yoke 300, the second metal screw 135 will not make contact with the electrically conductive member 136, and thus will not place the electrically conductive member 136 in electrical communication with the yoke 300. When the electrically conductive member 136 and the adapter 131 are attached to the yoke 300 in this manner, the faceplate assembly 130, in particular the electrically conductive member 136, may operate as a patch antenna that may cooperate with the antenna 400, for example as depicted in FIG. 11B, to provide the load control device 102 with a second wireless transmission range that is broader than the first wireless transmission range.

Figure 12:
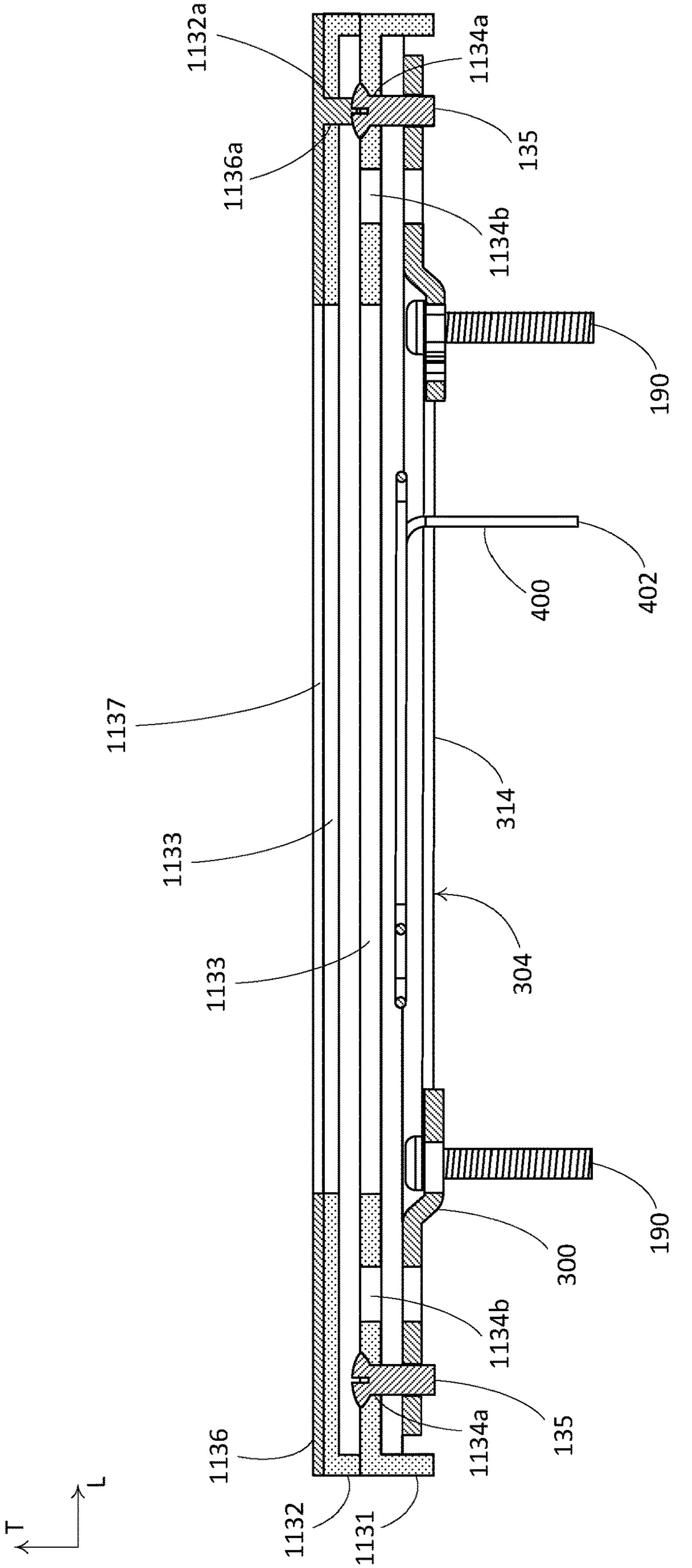
FIG. 12 is a side section view of an antenna assembly having an alternative electrically conductive element.

Referring now to FIG. 12, an alternative faceplate assembly 1130 is illustrated. Elements of the faceplate assembly 1130 labeled with reference numerals that refer to like elements of the faceplate assembly 130, incremented by 1000, may be assumed to be substantially the same as those of the faceplate assembly 130, unless otherwise described herein. The faceplate assembly 1130 may include an electrically conductive member 1136 (e.g., a decorative metal surface) that is configured to be attached to the faceplate 1132, for example an outer surface of the faceplate 1132. The electrically conductive member 1136 may be configured to be placed in electrical communication with the yoke 300 at one end (e.g., at only one end) of the yoke 300, as shown in FIG. 12. For example, the illustrated electrically conductive member 1136 includes a post 1136*a* (e.g., a tab or "finger") that is configured to abut a metal screw 135 used to secure the adapter 1131 to the yoke 300, such that the electrically conductive member 1136 is placed in electrical communication with the yoke 300 when the faceplate 1132 is attached to the adapter 1131. The faceplate 1132 may define an aperture 1132*a* that extends through the faceplate 1132 along a direction that is substantially parallel to the transverse direction T and is sized to receive the post 1136*a* when the electrically conductive member 1136 is attached to the faceplate 1132.

Figure 13:
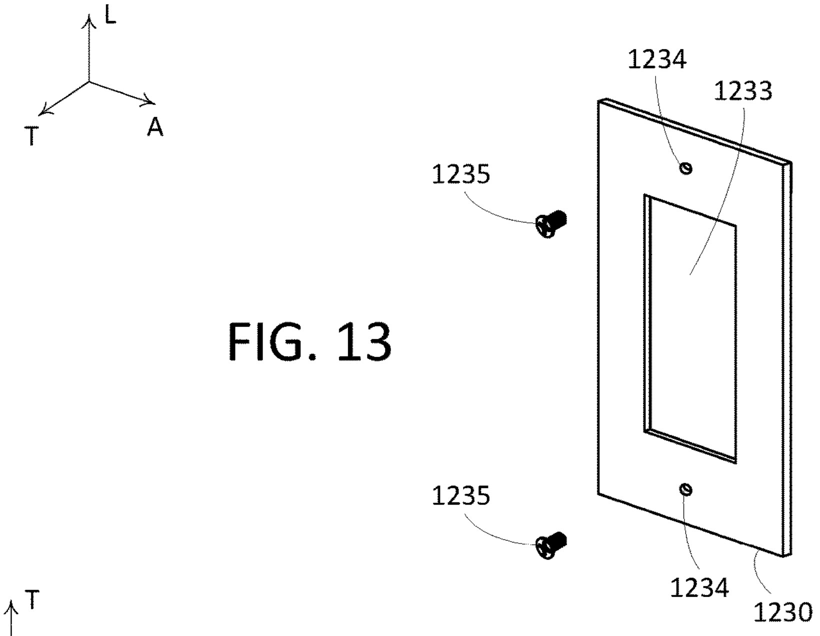
FIG. 13 is a perspective exploded view of an alternative faceplate assembly including a one piece faceplate.
Figure 14:
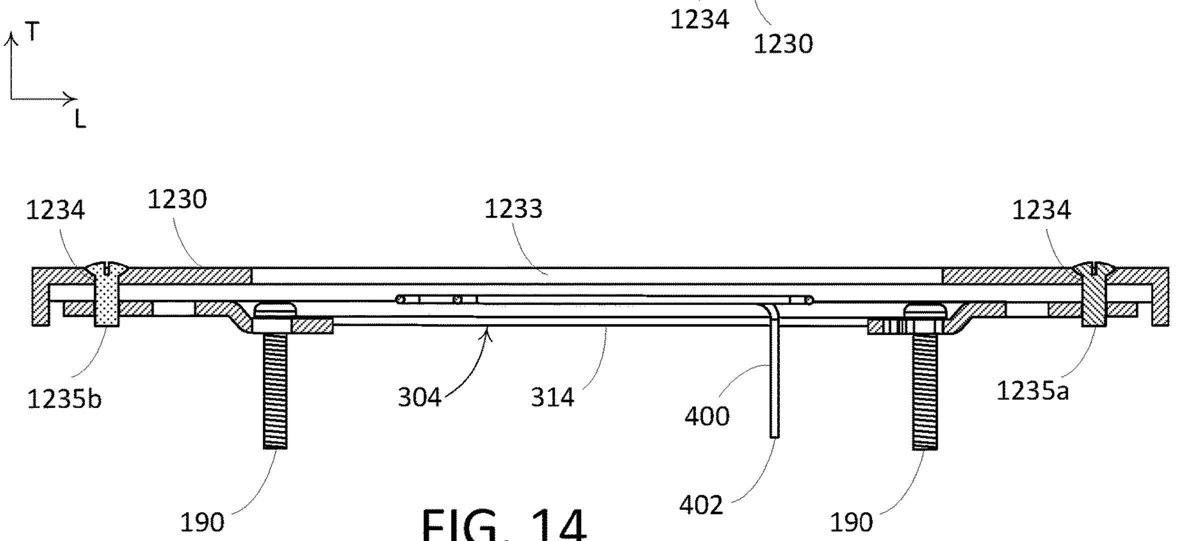
FIG. 14 is a side section view of a wireless communication range extending configuration of the load control device using the one piece faceplate illustrated in FIG. 13.
Figure 15:
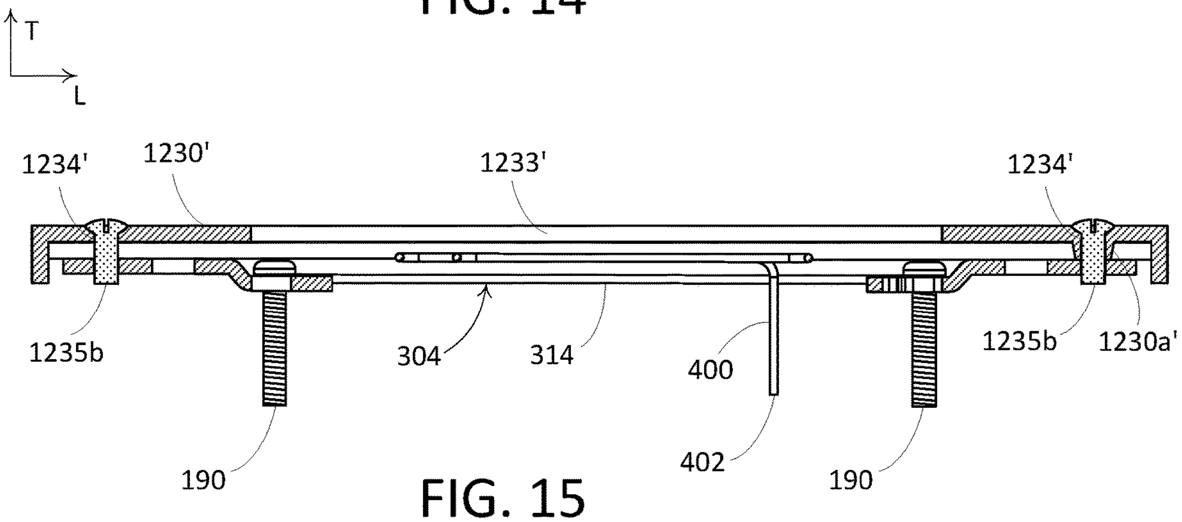
FIG. 15 is a side section view of a wireless communication range extending configuration of the load control device using an alternative one piece faceplate.

Referring now to FIGS. 13-15, the load control device 102 is not limited to the range extending faceplate assemblies 130, 1130. For example, the load control device 102 may be alternatively configured with a one piece faceplate 1230 that may be configured to operate as a range extending faceplate. The faceplate 1230 may define an opening 1233 that may be sized substantially the same as the opening 133 of the faceplate assembly 130, for example. The faceplate 1230 may define one or more apertures configured to receive fasteners in order to attach the faceplate 1230 to the yoke 300. For example, the faceplate 1230 may include a pair of apertures 1234 that extend through the faceplate 1230 along a direction that is substantially parallel to the transverse direction T and are configured to receive screws 1235 that attach the faceplate 1230 to the yoke 300.

FIG. 14 illustrates a one piece range extending faceplate 1230 that is made of metal and attached to the yoke 300 using a first electrically conductive screw 1235*a* that may be made of an electrically conductive material (e.g., metal) and a second electrically insulative screw 1235*b* that may be made of an electrically insulative material (e.g., plastic). The faceplate 1230 may be placed in electrical communication with the yoke 300 via the first electrically conductive screw 1235*a*, such that the faceplate 1230 operates as a patch antenna that may cooperate with the antenna 400, for example as depicted in FIG. 11B, to provide the load control device 102 with a second wireless transmission range that is broader than the first wireless transmission range.

FIG. 15 illustrates an alternative one piece range extending faceplate 1230' that is made of metal and attached to the yoke 300 using two electrically insulative screws 1235*b* that may be made of an electrically insulative material (e.g., plastic). The faceplate 1230' is constructed substantially the same as the faceplate 1230, including an opening 1233' and two apertures 1234' configured to receive the screws 1235*b*, but further includes a silo 1230*a'* that extends from an inner surface of the faceplate 1230' along a direction that is substantially parallel to the transverse direction T and that is configured to at least partially receive a respective one of the electrically insulative screws 1235*b*. The silo 1230*a'* may define a length along the transverse direction T such that a free end of the silo 1230*a'* abuts at least a portion of the yoke 300 when the faceplate 1230' is attached to the yoke 300, thereby placing the faceplate 1230' in electrical communication with the yoke 300. The silo 1230*a'* may be made of an electrically conducive material, such as metal. The silo 1230*a'* and faceplate 1230' may be monolithic, and may be made of the same metal.

The invention claimed is:

1. A wallbox-mountable electric load control apparatus comprising:

a faceplate member having a front surface and a rear surface, the faceplate member couplable to an electrical wallbox;

radio frequency transmitter circuitry disposable within the electrical wallbox;

an antenna structure coupled to the RF transmitter circuitry, the first antenna structure having a transmission range, the first antenna structure disposed within the area of the faceplate; and an electrically conductive element isolated from the RF transmitter circuitry, the electrically conductive element to cooperate with the antenna structure to provide a transmission range greater than the antenna structure transmission range, the electrically conductive element disposed within the area of the faceplate.

2. The wallbox-mountable electric load control apparatus of claim 1, further comprising:

a yoke structure couplable to the electrical wallbox.

3. The wallbox-mountable electric load control apparatus of claim 2 wherein the yoke structure further comprises:

a "C-shaped" yoke structure couplable to the electrical wallbox.

4. The wallbox-mountable electric load control apparatus of claim 2 wherein the "C-shaped" yoke structure further comprises:

an electrically conductive shorting member disposed across the open portion of the "C-shaped" yoke structure to form an electrically conductive loop structure.

5. The wallbox-mountable electric load control apparatus of claim 2, further comprising:

an electrically conductive member conductively coupling the electrically conductive element to the yoke structure.

6. The wallbox-mountable electric load control apparatus of claim 1 wherein the electrically conductive element is positionable proximate at least a portion of the rear surface of the faceplate member.

7. The wallbox-mountable electric load control apparatus of claim 1 wherein the antenna structure comprises a monopole antenna structure.

8. The wallbox mountable electric load control apparatus of claim 7 wherein the monopole antenna structure comprises an open outer loop that having a first end and an open inner loop that includes a second end, the open outer loop coplanar with and at least partially surrounding an open inner loop.

9. The wallbox-mountable electric load control apparatus of claim 1, further comprising:

a controllably conductive device disposable in the electrical wallbox; and control circuitry disposable in the electrical wallbox, the control circuitry to reversibly transition the controllably conductive device between a CONDUCTIVE state and a NON-CONDUCTIVE state to adjust power delivered to an operatively coupled electric load device.

10. The wallbox-mountable electric load control apparatus of claim 1:

wherein the faceplate member comprises a planar faceplate member; and wherein the electrically conductive element comprises a planar electrically conductive element.

11. The wallbox-mountable electric load control apparatus of claim 10 wherein the planar electrically conductive element includes at least one aperture.

12. The wallbox-mountable electric load control apparatus of claim 11:

wherein the antenna structure comprises a planar structure defining a first plane;

wherein the faceplate member comprises a planar member defining a second plane, the second plane parallel to the first plane; and wherein the electrically conductive element comprises a planar member defining a third plane, the third plane between the first plane and the second plane, the third plane parallel to the first plane and the second plane.

13. The wallbox-mountable electric load control apparatus of claim 2, further comprising an adapter member;

wherein the adapter member comprises a non-electrically conductive member physically couplable to the yoke member;

wherein the faceplate member comprises a faceplate member physically couplable to the adapter member;

wherein the rear surface of the faceplate member comprises a non-electrically conductive material; and wherein the electrically conductive element is disposed between the adapter member and the rear surface of the faceplate member.

* * * * *